United States Patent
Stierman et al.

(10) Patent No.: US 7,720,254 B2
(45) Date of Patent: May 18, 2010

(54) AUTOMATIC MICROPARTICLE MARK READER

(75) Inventors: Thomas Stierman, Mahtomedi, MN (US); Dan Hunt, Mounds View, MN (US); Chris Zdon, Minneapolis, MN (US); Paul Meyers, Minneapolis, MN (US); Steven D. Zimmermann, Knoxville, TN (US); Christopher S. Gourley, Sweetwater, TN (US)

(73) Assignee: SMI Holdings, Inc., Arden Hills, MN (US)

( * ) Notice: Subject to any disclaimer, the term of this patent is extended or adjusted under 35 U.S.C. 154(b) by 202 days.

(21) Appl. No.: 11/685,764

(22) Filed: Mar. 13, 2007

(65) Prior Publication Data
US 2009/0136079 A1 May 28, 2009

Related U.S. Application Data

(60) Provisional application No. 60/781,930, filed on Mar. 13, 2006, provisional application No. 60/781,955, filed on Mar. 13, 2006, provisional application No. 60/781,626, filed on Mar. 13, 2006.

(51) Int. Cl.
*G06K 9/00* (2006.01)
(52) U.S. Cl. ...................... 382/100; 382/162
(58) Field of Classification Search ................ 382/100, 382/162, 164, 165, 108; 726/22, 34–35, 726/9–10; 40/326, 312, 828, 630, 638, 594; 428/402, 403, 411.1; 427/7, 157, 292, 197, 427/198, 199; 252/408.1, 965, 301.36; 713/176; 705/58; 235/380
See application file for complete search history.

(56) References Cited

U.S. PATENT DOCUMENTS

| | | | |
|---|---|---|---|
| 1,787,995 A | 1/1931 | Reilly |
| 2,058,774 A | 10/1936 | Colligan |
| 2,088,412 A | 7/1937 | Grosvenor |
| 2,265,196 A | 12/1941 | Riley |
| 2,687,367 A | 8/1954 | Burrin |
| 2,885,366 A | 5/1959 | Iler |
| 2,963,378 A | 12/1960 | Palmquist et al. |
| 3,013,958 A | 12/1961 | Fearon |
| 3,113,991 A | 12/1963 | Kleber |

(Continued)

FOREIGN PATENT DOCUMENTS

CA 1056653 6/1979

(Continued)

OTHER PUBLICATIONS

Intrinsic Signature Indentification System (ISIS), Verification Technologies, Inc., http://www.netventure.com/vti/isis/main.htm, Aug. 26, 1999, 2 pages.

(Continued)

*Primary Examiner*—Sherali Ishrat
(74) *Attorney, Agent, or Firm*—Patterson, Thuente, Skaar & Christensen, P.A.

(57) ABSTRACT

An automatic reader system, apparatus, and method for the identification and authentication of articles enabling automatic collection and processing of code data associated with microparticle marks, automatic determination of the code from the code data associated with microparticle marks, and automatic retrieval of reference information associated with the code.

24 Claims, 14 Drawing Sheets

U.S. PATENT DOCUMENTS

| | | | |
|---|---|---|---|
| 3,128,744 A | 4/1964 | Jefferts et al. | |
| 3,366,573 A | 1/1968 | Feuer | |
| 3,451,778 A | 6/1969 | Fearon | |
| 3,567,909 A | 3/1971 | Allen | |
| 3,574,550 A | 4/1971 | Scott et al. | |
| 3,574,909 A | 4/1971 | Brenner, Jr. | |
| 3,628,271 A | 12/1971 | Carrell et al. | |
| 3,632,993 A | 1/1972 | Acker | |
| 3,663,685 A | 5/1972 | Evans | |
| 3,663,801 A | 5/1972 | Wahli et al. | |
| 3,700,305 A | 10/1972 | Bingham | |
| 3,704,952 A | 12/1972 | Bird | |
| 3,733,178 A | 5/1973 | Eriksen | |
| 3,736,500 A | 5/1973 | Berkowitz et al. | |
| 3,772,099 A | 11/1973 | Ryan et al. | |
| 3,772,200 A | 11/1973 | Livesay | |
| 3,788,814 A | 1/1974 | Goldblatt et al. | |
| 3,835,297 A | 9/1974 | Inoue et al. | |
| 3,835,782 A | 9/1974 | Griffith et al. | |
| 3,861,886 A | 1/1975 | Meloy | |
| 3,897,284 A | 7/1975 | Livesay | |
| 3,950,891 A | 4/1976 | Hinkes | |
| 3,958,041 A | 5/1976 | Wagner et al. | |
| 3,964,294 A | 6/1976 | Shair et al. | |
| 3,967,990 A | 7/1976 | Ryan et al. | |
| 3,985,602 A | 10/1976 | Stuart | |
| 4,013,490 A | 3/1977 | Ryan et al. | |
| 4,018,635 A | 4/1977 | Ryan et al. | |
| 4,023,040 A | 5/1977 | Weber | |
| 4,029,506 A | 6/1977 | Dessauer | |
| RE29,334 E | 8/1977 | Ryan et al. | |
| 4,053,433 A * | 10/1977 | Lee | 252/408.1 |
| 4,097,279 A | 6/1978 | Whitehead | |
| 4,131,064 A | 12/1978 | Ryan et al. | |
| 4,197,104 A | 4/1980 | Krystyniak et al. | |
| 4,198,307 A | 4/1980 | Berkowitz et al. | |
| 4,223,004 A | 9/1980 | Hsia et al. | |
| 4,238,524 A | 12/1980 | LaLiberte et al. | |
| 4,243,734 A | 1/1981 | Dillon | |
| 4,251,726 A | 2/1981 | Alvarez | |
| 4,321,056 A | 3/1982 | Dimitroff | |
| 4,329,393 A | 5/1982 | LaPerre et al. | |
| 4,359,353 A | 11/1982 | Kydd | |
| 4,359,399 A | 11/1982 | Boyars | |
| 4,390,452 A * | 6/1983 | Stevens | 252/408.1 |
| 4,397,142 A | 8/1983 | Bingham | |
| 4,399,226 A | 8/1983 | Danielson et al. | |
| 4,431,766 A | 2/1984 | Christie et al. | |
| 4,441,943 A | 4/1984 | Kydd | |
| 4,469,623 A | 9/1984 | Danielson et al. | |
| 4,520,109 A | 5/1985 | Simmonds et al. | |
| 4,606,927 A * | 8/1986 | Jones | 427/7 |
| 4,640,035 A | 2/1987 | Kind et al. | |
| 4,652,395 A | 3/1987 | Marcina et al. | |
| 4,654,165 A | 3/1987 | Eisenberg | |
| 4,690,689 A | 9/1987 | Malcosky et al. | |
| 4,715,988 A | 12/1987 | Colin | |
| 4,731,531 A | 3/1988 | Handke | |
| 4,744,919 A | 5/1988 | O'Holleran | |
| 4,764,474 A | 8/1988 | Orelup | |
| 4,771,005 A | 9/1988 | Spiro | |
| 4,785,290 A | 11/1988 | Goldman | |
| 4,812,171 A | 3/1989 | Brettle et al. | |
| 4,812,412 A | 3/1989 | Turner | |
| 4,824,144 A | 4/1989 | Tasma | |
| 4,862,143 A | 8/1989 | Hirshfield et al. | |
| 4,939,372 A | 7/1990 | Schvoerer et al. | |
| 5,023,923 A | 6/1991 | Sanner et al. | |
| 5,035,920 A | 7/1991 | Smrt et al. | |
| 5,057,268 A | 10/1991 | Muller | |
| 5,111,882 A | 5/1992 | Tang et al. | |
| 5,118,369 A | 6/1992 | Shamir | |
| 5,129,974 A | 7/1992 | Aurenius | |
| 5,169,558 A | 12/1992 | Smrt et al. | |
| 5,179,027 A | 1/1993 | Fisher | |
| 5,217,708 A | 6/1993 | Pinkney | |
| 5,246,861 A | 9/1993 | Miller et al. | |
| 5,256,572 A | 10/1993 | Tang et al. | |
| 5,267,756 A | 12/1993 | Molee et al. | |
| 5,268,899 A | 12/1993 | Brown | |
| 5,272,216 A | 12/1993 | Clark, Jr. et al. | |
| 5,294,476 A | 3/1994 | Calhoun | |
| 5,310,222 A | 5/1994 | Chatwin et al. | |
| 5,380,047 A | 1/1995 | Molee et al. | |
| 5,391,595 A | 2/1995 | Clark, Jr. et al. | |
| 5,411,799 A | 5/1995 | Loving | |
| 5,426,289 A | 6/1995 | Kinoshita et al. | |
| 5,435,249 A | 7/1995 | Brent et al. | |
| 5,450,190 A | 9/1995 | Schwartz et al. | |
| 5,454,324 A | 10/1995 | Larmignat et al. | |
| 5,474,937 A | 12/1995 | Anderson, II et al. | |
| 5,521,984 A | 5/1996 | Denenberg et al. | |
| 5,568,555 A | 10/1996 | Shamir | |
| 5,619,025 A | 4/1997 | Hickman et al. | |
| 5,637,169 A | 6/1997 | Hull et al. | |
| 5,659,631 A | 8/1997 | Gormish et al. | |
| 5,673,338 A | 9/1997 | Denenberg et al. | |
| 5,677,187 A | 10/1997 | Anderson, II et al. | |
| 5,760,394 A | 6/1998 | Welle | |
| 5,763,176 A | 6/1998 | Slater et al. | |
| 5,789,183 A | 8/1998 | Lee et al. | |
| 5,798,147 A | 8/1998 | Beck et al. | |
| 5,818,032 A | 10/1998 | Sun et al. | |
| 5,830,542 A | 11/1998 | Shigeno et al. | |
| 5,837,042 A | 11/1998 | Lent et al. | |
| 5,869,828 A | 2/1999 | Braginsky | |
| 5,873,604 A | 2/1999 | Phillips | |
| 5,888,444 A | 3/1999 | Dannenhauer et al. | |
| 5,962,082 A | 10/1999 | Hendrickson et al. | |
| 5,974,150 A | 10/1999 | Kaish et al. | |
| 5,974,974 A | 11/1999 | Agnew et al. | |
| 6,019,287 A | 2/2000 | Mann | |
| 6,025,200 A | 2/2000 | Kaish et al. | |
| 6,030,000 A | 2/2000 | Diamond | |
| 6,108,612 A | 8/2000 | Vescovi et al. | |
| 6,147,149 A | 11/2000 | Anderson et al. | |
| 6,165,609 A | 12/2000 | Curatolo | |
| 6,200,628 B1 | 3/2001 | Rozumek et al. | |
| 6,203,736 B1 | 3/2001 | Gailberger et al. | |
| 6,232,124 B1 | 5/2001 | Selinfreund | |
| 6,309,690 B1 | 10/2001 | Brogger et al. | |
| 6,406,725 B1 | 6/2002 | Taylor | |
| 6,432,715 B1 | 8/2002 | Nelson et al. | |
| 6,455,157 B1 * | 9/2002 | Simons | 428/402 |
| 6,458,595 B1 | 10/2002 | Selinfreund | |
| 6,477,227 B1 | 11/2002 | Kaiser et al. | |
| 6,490,030 B1 | 12/2002 | Gill et al. | |
| 6,501,825 B2 | 12/2002 | Kaiser et al. | |
| 6,512,580 B1 | 1/2003 | Behringer et al. | |
| 6,524,859 B1 | 2/2003 | Heese et al. | |
| 6,525,111 B1 | 2/2003 | Spencer et al. | |
| 6,572,784 B1 | 6/2003 | Coombs et al. | |
| 6,589,626 B2 | 7/2003 | Selinfreund et al. | |
| 6,609,728 B1 | 8/2003 | Voerman et al. | |
| 6,611,612 B2 | 8/2003 | Mann | |
| 6,620,360 B1 | 9/2003 | Simons | |
| 6,630,960 B2 | 10/2003 | Takahashi et al. | |
| 6,638,593 B2 | 10/2003 | Selinfreund et al. | |
| 6,647,649 B2 * | 11/2003 | Hunt et al. | 40/326 |
| 6,659,507 B2 | 12/2003 | Banahan | |
| 6,691,916 B2 | 2/2004 | Noyes | |
| 6,692,031 B2 | 2/2004 | McGrew | |
| 6,701,304 B2 | 3/2004 | Leon | |
| 6,707,539 B2 | 3/2004 | Selinfreund et al. | |

| | | | |
|---|---|---|---|
| 6,708,618 B1 | 3/2004 | Tsai | |
| 6,721,440 B2 | 4/2004 | Reed et al. | |
| 6,735,324 B1 | 5/2004 | McKinley et al. | |
| 6,850,592 B2 | 2/2005 | Schramm et al. | |
| 6,899,827 B2 | 5/2005 | Lauf et al. | |
| 6,908,737 B2 | 6/2005 | Ravkin et al. | |
| 6,909,770 B2 | 6/2005 | Schramm et al. | |
| 6,948,068 B2 * | 9/2005 | Lawandy et al. | 713/176 |
| 6,989,525 B2 | 1/2006 | Howard | |
| 7,038,766 B2 | 5/2006 | Kerns et al. | |
| 7,039,214 B2 | 5/2006 | Miller et al. | |
| 7,046,828 B1 | 5/2006 | Gibbs et al. | |
| 7,055,691 B2 | 6/2006 | Safian | |
| 7,288,320 B2 | 10/2007 | Steenblik et al. | |
| 7,389,420 B2 | 6/2008 | Tian | |
| 2001/0041214 A1 | 11/2001 | Brogger et al. | |
| 2001/0049101 A1 | 12/2001 | Brogger et al. | |
| 2002/0009208 A1 | 1/2002 | Alattar et al. | |
| 2002/0023218 A1 | 2/2002 | Lawandy et al. | |
| 2002/0122878 A1 | 9/2002 | Kerns et al. | |
| 2002/0129523 A1 | 9/2002 | Hunt | |
| 2003/0032033 A1 | 2/2003 | Anglin et al. | |
| 2003/0036201 A1 | 2/2003 | Nelson et al. | |
| 2003/0058990 A1 | 3/2003 | Kaiser et al. | |
| 2003/0133537 A1 | 7/2003 | Schramm et al. | |
| 2003/0194052 A1 | 10/2003 | Price et al. | |
| 2003/0194053 A1 | 10/2003 | Schramm et al. | |
| 2003/0211288 A1 | 11/2003 | Schottland | |
| 2004/0004829 A1 | 1/2004 | Policappelli | |
| 2004/0029295 A1 | 2/2004 | Brogger et al. | |
| 2004/0067360 A1 | 4/2004 | Steenblik et al. | |
| 2004/0098891 A1 | 5/2004 | Hunt et al. | |
| 2004/0227112 A1 | 11/2004 | Howard | |
| 2005/0031838 A1 | 2/2005 | Lagunowich et al. | |
| 2005/0092408 A1 | 5/2005 | Lauf et al. | |
| 2005/0094848 A1 | 5/2005 | Carr et al. | |
| 2005/0135656 A1 | 6/2005 | Alattar et al. | |
| 2005/0150964 A1 | 7/2005 | Lo | |
| 2005/0181511 A1 | 8/2005 | Mun et al. | |
| 2005/0189255 A1 | 9/2005 | Safian | |
| 2005/0230962 A1 | 10/2005 | Berson | |
| 2005/0239207 A1 | 10/2005 | Gelbart | |
| 2005/0255599 A1 | 11/2005 | Wang et al. | |
| 2005/0264001 A1 | 12/2005 | Kerns et al. | |
| 2005/0276906 A1 | 12/2005 | Metzger | |
| 2005/0289061 A1 | 12/2005 | Kulakowski et al. | |
| 2006/0014045 A1 | 1/2006 | Einhorn et al. | |
| 2006/0037222 A1 | 2/2006 | Hunt et al. | |
| 2006/0091670 A1 | 5/2006 | Gaynor | |
| 2006/0244253 A1 | 11/2006 | Wei | |
| 2007/0063051 A1 | 3/2007 | László et al. | |
| 2007/0254138 A1 | 11/2007 | Remmer | |
| 2008/0034426 A1 * | 2/2008 | Stierman et al. | 726/22 |

FOREIGN PATENT DOCUMENTS

| | | |
|---|---|---|
| CA | 2223163 | 10/1997 |
| DE | 1961474 A1 | 7/1970 |
| EP | 0787656 | 5/2003 |
| GB | 1568699 | 6/1980 |
| GB | 2178481 A | 2/1987 |
| GB | 2286044 A | 8/1995 |
| GB | 2319337 A | 5/1998 |
| NL | 9301405 | 3/1995 |
| WO | WO 99/45514 | 9/1999 |
| WO | WO 00/34937 | 6/2000 |
| WO | WO 01/37207 A1 | 5/2001 |
| WO | WO 03/048726 A2 | 6/2003 |
| WO | WO 03/098188 A2 | 11/2003 |
| WO | WO 2004/089640 A2 | 10/2004 |
| WO | WO 2005/014928 | 2/2005 |
| WO | WO 2005/040001 | 5/2005 |
| WO | WO 2005/085087 | 9/2005 |
| WO | WO 2005/104008 A1 | 11/2005 |
| WO | WO 2005/119612 | 12/2005 |
| WO | WO 2005/123408 | 12/2005 |
| WO | WO 2007/106512 A2 | 9/2007 |
| WO | WO 2007/106514 A2 | 9/2007 |
| WO | WO 2007/106515 A2 | 9/2007 |

OTHER PUBLICATIONS

High Quality Sports Memorabilia, TRACERCODE®, Total Sports Concept, http://www.totalsportsconcepts.com/Authenticity.html, Mar. 15, 1999, 2 pages.

Kaplan "Maximizing the Benefits of Brand Security—New Developments for Smart Production," PMPS Magazine, Spring 2003 Issue, 3 pages.

Pappu, "Physical One-Way Functions," Science, Sep. 20, 2002, pp. 2026-2030, vol. 297, 5 pages.

PCT International Search Report, PCT/US07/06387, 2 pages.

PCT International Search Report, WO 2003/048726 A3, 2 pages.

PCT International Search Report, WO 2007/106514 A3, 3 pages.

PCT International Search Report, WO 2007/106512 A3, 3 pages.

PCT International Search Report, PCT/US 07/06388, 4 pages.

PCT International Preliminary Report on Patentability, PCT/US2007/006388 filed Mar. 13, 2007, 8 pages.

Fisher, "Copycat Killer", NewScientist, Apr. 21, 2007. www.newscientist.com. pp. 1-5.

Tagging makes RFID labels secure, says Creo. Canadian packaging technology company Creo has teamed up with XINK Laboratories, a company that makes conducting ink for printing radiofrequency identification (RFID) antennas, to address RFID tag security issues. Mat 30, 2005. pp. 1.

Kodak Traceless System for pharmaceutical anticounterfeiting. pp. 1. New Security Label Stocks from Creo and Acucote. Creo and ACucote Announce New Security Label Printing Stocks. The self-adhesive label stocks will combine Creo Traceless taggants into Acucote label materials. May 5, 2005. pp. 1-2.

Kodak Stop Counterfeiting Protect Your high-Liability Pharmaceuticals. pp. 1-28.

Harrell, If You want to Stop Counterfeiting or Track & Trace: Hi-Value Developed Brands — Pharmaceuticals & Cosmetics — Consumer Products. pp. 1-78.

US 6,780,301, 08/2004, Natan et al. (withdrawn)

* cited by examiner

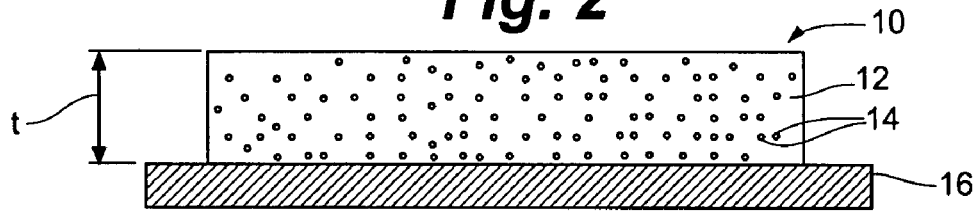
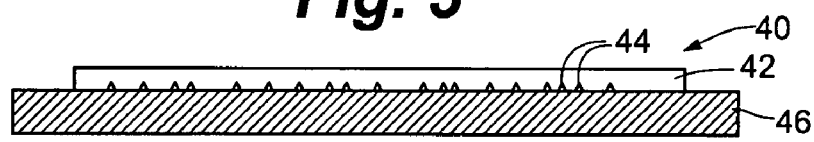
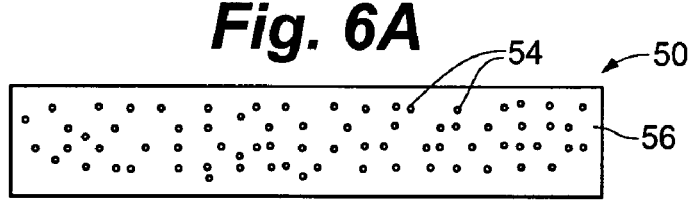
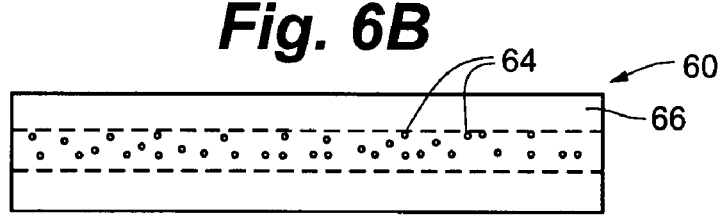

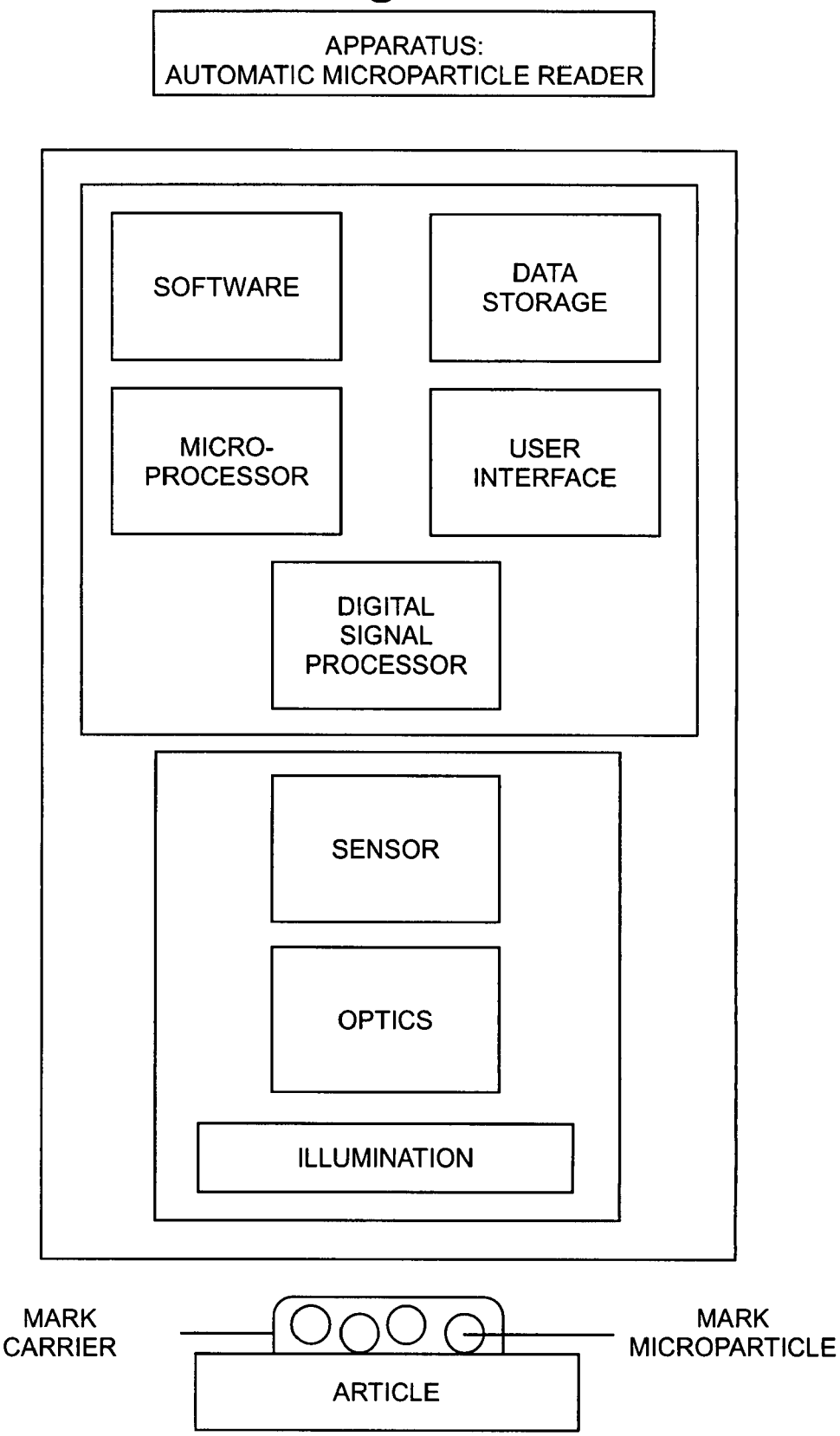

TOP VIEW

REAR VIEW

SIDE VIEW

FRONT VIEW

TOP VIEW
(WITHOUT LIGHT GUARD)

TOP VIEW
(WITH LIGHT GUARD)

SIDE VIEW

FRONT VIEW
(NON-RESTRICTED)

FRONT VIEW
(RESTRICTED)

AUTOMATIC MICROPARTICLE MARK READER

PRIORITY CLAIM

The present application claims the benefit of U.S. Provisional Application No. 60/781,626, filed Mar. 13, 2006, entitled "Three-Dimensional Authentication of Microparticle Mark," U.S. Provisional Application No. 60/781,955, filed Mar. 13, 2006, entitled "Unique Codes for Microparticle Marks Based on Signature Strings," and U.S. Provisional Application No. 60/781,930, filed Mar. 13, 2006, entitled "Automatic Microparticle Mark Reader," which are incorporated herein in their entirety by reference.

FIELD OF THE INVENTION

The present invention generally relates to articles having concealed or covert, yet revealable, information using marks incorporating a multiplicity of microparticles applied on or in the articles. More particularly, the present invention relates to automatic microparticle reader systems, apparatuses, and methods for identifying and authenticating articles using information obtained from a mark incorporating a multiplicity of microparticles on or in articles, article packaging, or article labeling.

BACKGROUND OF THE INVENTION

Counterfeiting, tampering, and product diversion account for nearly a half-trillion dollars in worldwide business losses every year. While these business losses are staggering, public trust is also declining as a result of these problems. News stories documenting problems such as black market fraud, theft, gray market goods, and product tampering contribute to the dwindling public trust in the authenticity of goods and services.

Marks incorporating a multiplicity of microparticles ("microparticle marks") have been used in the past to combat counterfeiting, tampering, and product diversion. Microparticles have been used for identifying and authenticating many types of materials and objects, including the use of microparticles directly in bulk materials (e.g., fertilizer, chemicals, paints, oils, plastics, pigments, clays, fertilizers, and explosives), the use of marks incorporating a multiplicity of microparticles on or in containers for prepackaged materials (e.g., shampoo, conditioner, lotion, motor oils, and pharmaceuticals), and the use of marks incorporating a multiplicity of microparticles on individual product units (e.g. stereos, cameras, computers, videocassette recorders (VCRs), furniture, motorized vehicles, and livestock).

Since the late 1970's, multi-layered color-coded microparticles specifically have been used to covertly mark materials and objects. U.S. Pat. Nos. 4,053,433 and 4,390,452 and GB Patent No. 1,568,699 describe multi-layered color coded particles for marking articles. Specifically, U.S. Pat. No. 4,053,433 describes a method of marking a substance with microparticles encoded with an orderly sequence of visually distinguishable colored segments detectable with a microscope or other magnifying device. GB Patent No. 1,568,699 describes systems for making microparticles of layered colored material, which have generally parallel flat surfaces with irregular broken edges there between, enabling visualization of the code.

Other examples of multi-layered color-coded microparticles are described in U.S. Pat. Nos. 6,647,649 and 6,455,157, wherein each describes methods for generating unique codes from sets of multi-layered color-coded microparticles. Additional types of microparticles are described in DE Patent No. 19,614,174 and U.S. Pat. No. 4,606,927. DE Patent No. 19,614,174 describes a process for producing multi-layered microparticles by forming a laminate sheet of colored layers and crushing the sheet. The individual marking layers are applied by a printing process, by bronzing, by spray painting, or by roll coating. U.S. Pat. No. 4,606,927 describes microparticles encased in a transparent solid matrix obtained by hardening a liquid adhesive.

While the use of multi-layered color-coded microparticles is generally known, the interrogation of marks generated with these particles has been done manually. Thus, the mark is either observed directly by an individual through magnifying optics (e.g., microscope) or an image of the mark is captured and subsequently observed by the individual. In both of these cases, the mark or image of the mark is interpreted by the individual, who then determines the microparticle code. This process can suffer from being expensive, time-consuming, and also presents the potential of human error in the identification of the microparticle code. As a result, the process is not practical for real time, larger volume applications, such as credit cards, passports, drivers' licenses, high-value branded products, and any tickets.

Automated reader systems have been developed for single expression microparticles, such as the readers for thermal or laser activated microparticle powders as described, for example, in PCT Pub. No. WO2005/104008A1. These single expression microparticle readers generally rely on both the "invisibility" of the microparticle until the microparticle is activated by the reader and the random location of the microparticles dispersed relative to a registration mark to create a unique code for the security and authentication purposes. Although such automated reader systems for identifying random patterns of single expression microparticles can be useful, the significantly higher level of complexity associated with automatically reading anything other than the presence and/or location of single expression microparticle marks has so far stymied the development of automated readers for multi-layer multi-color microparticle marks.

While the microparticles, including multi-layered color-coded microparticles, can represent a level of security that is generally useful in protecting against counterfeiting, tampering, and product diversion, it can be anticipated that a day will come in which counterfeiters will attempt to create two-dimensional images depicting marks incorporating a multiplicity of microparticles and place the counterfeit images on counterfeit or diverted products. Although a human may easily distinguish such two-dimensional replica images from a genuine three-dimensional multi-layer multi-color microparticle mark when viewing a magnified presentation of the actual microparticle mark, two-dimensional replica images create challenges for automated readers that rely on detecting the existence and location of single expression microparticle marks or powders.

There is therefore a need for an automatic microparticle reader system, apparatus, and method that can overcome the inherent deficiencies with conventional marking systems and methods.

SUMMARY OF THE INVENTION

The present invention overcomes the deficiencies with conventional anti-counterfeiting and anti-fraud marking systems by providing an automatic reader system, apparatus, and method for the identification and authentication of articles. The automatic reader system, apparatus, and method enable automatic collection and processing of mark data associated with color-coded microparticle marks, automatic determination of the code from the mark data associated with color-coded microparticle marks, and automatic retrieval of reference information associated with the code.

In an embodiment, the automatic reader system, apparatus, and method can be used for identifying and authenticating articles using expression codes based on signature strings generated relative to attributes of valid individual microparticles.

In a further embodiment, the automatic reader system, apparatus, and method can be used for authenticating marks on or in articles, article packaging, or article labeling, whereby the marks are verified to have authentic, three-dimensional objects such as microparticles.

BRIEF DESCRIPTION OF THE DRAWINGS

The invention may be more completely understood in consideration of the following detailed description of various embodiments of the invention in connection with the accompanying drawings, in which:

FIG. 2 is a cross-sectional view of the microparticle mark of FIG. 1;

FIG. 3 is a cross-sectional view of a microparticle mark according to a second embodiment depicting the structure of the microparticle mark;

FIG. 4 is a cross-sectional view of a microparticle mark according to a third embodiment depicting the structure of the microparticle mark;

FIG. 5 is a cross-sectional view of a microparticle mark according to a fourth embodiment depicting the structure of the microparticle mark;

FIG. 6A is a cross-sectional view of a microparticle mark according to a fifth embodiment depicting the structure of the microparticle mark;

FIG. 6B is a cross-sectional view of a microparticle mark according to a sixth embodiment depicting the structure of the microparticle mark;

FIG. 7 is a schematic diagram of a reader apparatus according to an embodiment of the present invention;

Figure 1:
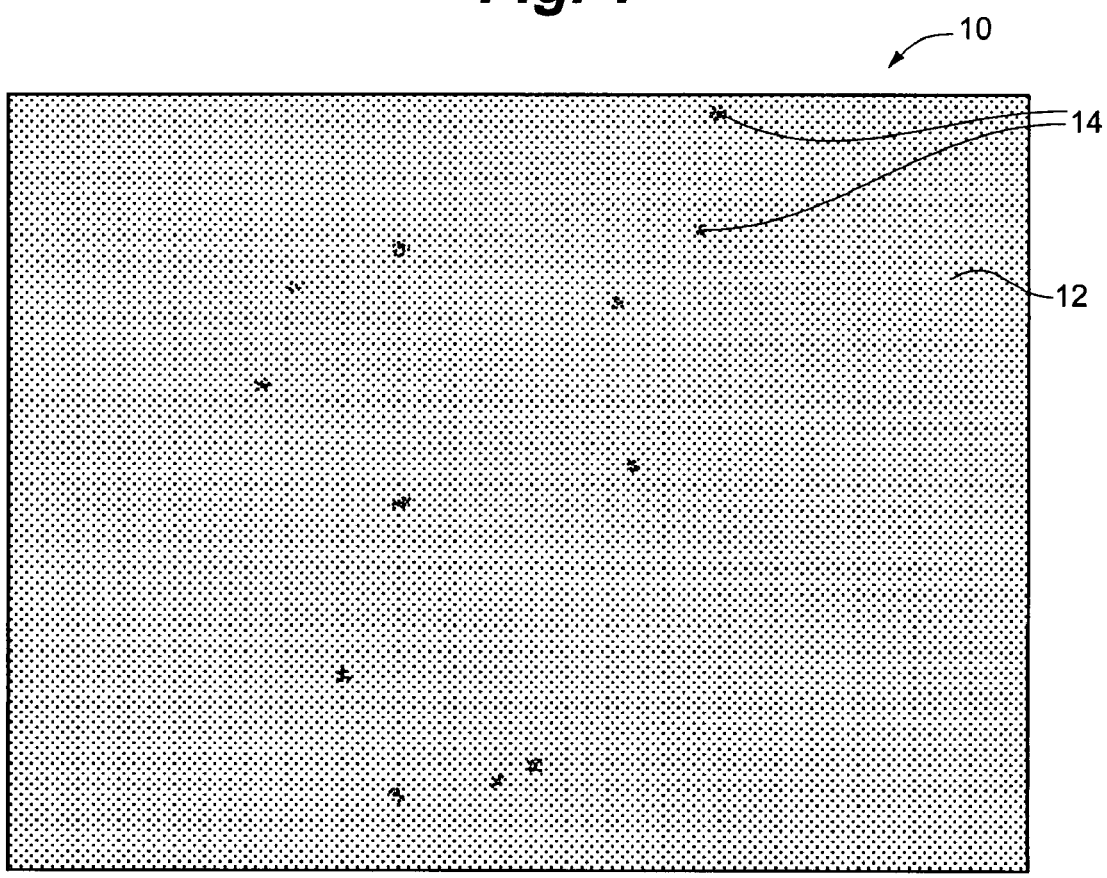
FIG. 1 is an image of a microparticle mark according to a first embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

This invention relates to the automation of the process for identification and/or authentication of articles using microparticle marks, which has historically been a manual process. The capture, processing, searching, and reporting steps of the identification/authentication processes described below can be conducted automatically using an automatic reader apparatus. The reader apparatus enables a user to place an article to be identified/authenticated in the field of view of the automatic reader. In one embodiment, the reader can manage the remainder of the process and provide the results. The automatic reader system, apparatus, and method enable automatic collection and processing of mark data associated with color-coded microparticle marks, automatic determination of the code from the mark data associated with color-coded microparticle marks, and automatic retrieval of reference information associated with the code.

The microparticle marks are adaptable to a wide range of products, including but not limited to the use of marks incorporating a multiplicity of microparticles on containers for prepackaged materials (e.g., shampoo, conditioner, lotion, motor oils, and pharmaceuticals), and on individual product units (e.g., stereos, cameras, computers, videocassette recorders (VCRs), furniture, motorized vehicles, livestock, auto and aircraft parts, pharmaceuticals, luxury products, credit and debit cards, identification (ID) cards, compact discs (CDs) and digital video discs (DVDs), agricultural seeds, and textiles). The microparticle marks can be placed on or in the product itself, the product packaging, or the product labeling so long as the microparticles are effectively frozen or locked in location as part of the microparticle mark.

Microparticle Mark Structure

As described herein, the various embodiments of the present invention relate to a system, apparatus, and method for identifying and authenticating articles using codes obtained from marks incorporating one or more microparticles on or in articles, article packaging, or article labeling. Except where as noted, for purposes of the present invention, "microparticles" are any relatively small particles comprising sizes, shapes, and other features described below. "Microparticles" as used herein is not limited to multi-layered multi-colored particles unless expressly indicated.

Referring to FIGS. 1 and 2, an authentic microparticle mark 10 according to a first embodiment generally comprises a carrier material 12 and microparticles 14 dispersed in the carrier material and presented on a substrate 16.

The microparticle mark 10 according to this first embodiment generally comprises a single carrier layer 12 presented on a substrate 16, the microparticles 14 being substantially homogenously dispersed therein. In the various embodiments described herein, the substrate can comprise the article to be authenticated directly, its packaging, its labeling, etc. Alternatively, the substrate may include other security devices, such as a hologram, RFID tag, a bar code, or any other identification or reference indicia adapted to be affixed to an article.

Referring to FIG. 3, an authentic microparticle mark 20 according to a second embodiment generally comprises microparticles 24 dispersed on an adhesive or coating material 22 and generally presented on a substrate 26. The microparticles 24 in this second embodiment can be dispersed generally uniformly but randomly located and oriented on the carrier material 22. Alternatively, at least some of the microparticles 24 may be intentionally located at specific positions on the carrier material 22 or the microparticles 24 may be located in a pseudorandom manner.

Referring to FIG. 4, an authentic microparticle mark 30 according to a third embodiment generally comprises microparticles 34 dispersed directly on a substrate 36. The microparticles 34 can be projected towards the substrate 36 with a low, medium, or high velocity, such that the microparticles 34 are at least partially embedded into or onto the substrate material. The velocity of the projection can depend upon the relative hardness of the substrate. The microparticles 34 in this third embodiment can be dispersed generally uniformly but randomly located and oriented in or on the substrate 36. Alternatively, at least some of the microparticles 34 may be intentionally located at specific positions on the substrate 36 or the microparticles 34 may be located in a pseudorandom manner.

Referring to FIG. 5, an authentic microparticle mark 40 according to a fourth embodiment is similar to that of the microparticle mark 30 according to a third embodiment, except that the microparticles 44 can be partially or fully covered with carrier material 42 to retain the microparticles 44 dispersed on the substrate 46. Such a carrier material 42 can include an adhesive, varnish, or similar securing arrangement. In another embodiment, the coating material 42 may be one or more layers of film or laminate that generally secure the microparticles 44 in position relative to each other and in some embodiments the adhesive may be on the laminate of the coating material 42, on the substrate 46 or both. The microparticles 44 in this fourth embodiment can be dispersed generally uniformly but randomly located and oriented in or on the substrate 46. Alternatively, at least some of the microparticles 44 may be intentionally located at specific positions on the substrate 46 or the microparticles 44 may be located in a pseudorandom manner.

Referring to FIGS. 6A and 6B, authentic microparticle marks 50, 60 according to fifth and sixth embodiments generally comprises microparticles 54, 64 dispersed in a substrate 56, 66, respectively. The microparticles in the fifth and sixth embodiments can be dispersed generally uniformly and randomly throughout the thickness of the substrate 56 as depicted in FIG. 6A or within a layer of the substrate 66 as depicted in FIG. 6B. It will be understood that the layer containing the microparticles may be sandwiched between other layers of the substrate without microparticles, or the layer may be adjacent a surface of the substrate, or there may be multiple layers. Alternatively, at least some of the microparticles of microparticle marks 50, 60 may be intentionally located at specific positions on the substrates 56, 66 or may be located in a pseudorandom manner.

In any of the embodiments described above, the microparticles can be dispersed generally uniformly but randomly located and oriented throughout the carrier material or substrate. Alternatively, in other embodiments at least some of the microparticles may be intentionally located at predetermined locations and/or patterns within the carrier material or substrate. Such intentionally positioned microparticles can form a registration and/or identification pattern to be used in conjunction with the scanning of other randomly oriented microparticles as part of the microparticle mark, or can be comprise the microparticles of the microparticle mark. In still other embodiments, at least some of the microparticles may be pseudo randomly positioned in the carrier material or substrate, such as preferentially doping some areas/volumes with higher concentration of microparticles than other areas/volumes.

While not limited to such, the microparticles used for the microparticle marks according to the various embodiments of the present invention can comprise multi-layered color-coded microparticles. Examples of such multi-layered color-coded microparticles capable of expressing a first-level microparticle code are described in U.S. Pat. Nos. 4,053,433, 4,390,452, 4,606,927, 6,309,690, 6,455,157, 6,647,649, 6,620,360, Great Britain Patent No. GB 1,568,699, and German Patent No. DE 19614174, all of which are incorporated herein by reference in their entirety. It will be understood that for purposes of the present invention, existing microparticles are considered capable of generating a first-level microparticle code if the microparticle mark method and system in which these microparticles are being utilized enables observation, viewing or reading of each microparticle in such a way as to express more than a binary state of that single microparticle. For example, a multi-layer, multi-color microparticle coding system having 4 particles and each having 3 layers and formulated with 12 color possibilities would be capable of expressing up to 9,834,496 unique combinations of color arrangements, each of which would represent a different microparticle code from within that individual microparticle coding system.

An additional level of code can be used for identifying and authenticating articles using expression codes based on signature strings for individual microparticles, such as is described in the patent application entitled "EXPRESSION CODES FOR MICROPARTICLE MARKS BASED ON SIGNATURE STRINGS," attached hereto as Appendix A and incorporated herein by reference in its entirety. In addition, marks on or in articles, article packaging, or article labeling, can be authenticated by verifying that the marks have authentic, three-dimensional objects such as microparticles, such as is described in the patent application entitled, "THREE-DIMENSIONAL AUTHENTICATION OF MICROPARTICLE MARK," attached as Appendix B and incorporated herein by reference in its entirety.

In addition to comprising a multi-layer color-coded structure, the microparticles can comprise additional characteristics that are further usable in generating an expression of information. Such additional characteristics include, for example, text or other indicia on one or more of the microparticle surfaces, reflectivity, shapes, refractive index, surface geometry or finish, dynamic crystal lattice properties (such as magneto-electrooptic properties, mechanical-electrooptic properties, or thermal-electrooptic properties associated with lattice structures, such as LCD or piezoelectric materials), and various optical properties including polarization. For example, the index of refraction of the microparticles and carrier material can be selected to optimize the ability to distinguish and sharpen the visual distinction between the microparticles from the carrier material when using a reader.

In embodiments comprising multi-layered color-coded microparticles or in other embodiments, the microparticles used for the microparticle marks can comprise one or more reflective layers and/or one or more non-reflective surfaces. For example, the multi-layered color-coded microparticles can include a reflective layer at one end thereof and a non-reflective layer at the other end thereof, with one or more intermediate multi-colored layers there between. In other embodiments, the microparticles can include a reflective layer at one end thereof and a non-reflective layer at the other end thereof, with no multi-colored layers there between.

In the embodiments in which the microparticles comprise reflective surfaces, the reflective properties of the microparticles can be such that any reflection off of the reflective surfaces is not detectable by a naked eye, but is detectable under magnification to retain the covertness of the microparticle mark. In other embodiments, the reflective properties of the microparticles can be detectable by a naked eye or under any type of low magnification. This can be used in marks in which it is desirable to warn any potential counterfeiters that the product, packaging, or labeling contains a microparticle mark as depicted and described herein. In these embodiments, the microparticles comprising reflective surfaces can be arranged to form words, marks, or other indicia that can be detectable by a naked eye or under any type of low magnification.

In further embodiments, the microparticles used for the microparticle marks can comprise one or more generally clear or lucid (transparent or translucent) layers therein. The clear or lucid layers can further aid in identifying and authenticating a mark.

In other embodiments, the microparticles used for the microparticle marks can comprise one or more generally dynamic crystal lattice layers or components. The dynamic crystal lattice layers or components can further aid in hiding, identifying, and/or authenticating a mark.

For many applications, microparticles are about 0.1 micron to about 500 microns at their average cross section dimension, preferably about 0.1 micron to about 100 microns, and optimally in ranges of about 1 micron to about 10 microns, about 10 microns to about 20 microns, about 20 microns to about 40 microns, and about 40 microns to about 100 micrometers. The size of the microparticles can depend upon the applications, for example, in printing applications it can be desirable to have microparticles of less than about 10 microns. A person of ordinary skill in the art will recognize that additional ranges within the explicit ranges given above are contemplated and are within the present disclosure.

The microparticles can have various aspect ratios. In an embodiment, the microparticles have an aspect ratio of approximately 1:1. By having such an aspect ratio, the microparticles may be more easily applied and randomly oriented within or on a carrier, adhesive, or coating or on a substrate. This may become important when verifying that a mark has three-dimensional objects, such as microparticles, therein, or when generating expression codes based on signature strings. In other embodiments, the microparticles have an aspect ratio of approximately 1:2. In further embodiments, the microparticles have an aspect ratio of approximately 1:4, 1:8, or 1:16. A person of ordinary skill in the art will recognize that additional aspect ratios within the explicit aspect ratios given above are contemplated and are within the present disclosure.

The concentration of microparticles used to identify an object can also vary. For example, the microparticles might be incorporated directly into the article, its packaging, or its labeling at a concentration of 0.0001 to 10 parts by weight for every 100 parts by weight material, and in another embodiment at a concentration of 0.001 to 3 parts by weight for every 100 part by weight material. Alternatively, the microparticles can be combined with an adhesive or carrier at a concentration of 0.0001 to 10 parts by weight for every 100 parts by weight material, and in another embodiment at a concentration of 0.001 to 3 parts by weight for every 100 part by weight material. A person of ordinary skill in the art will recognize that additional ranges within the explicit ranges given above are contemplated and are within the present disclosure.

The overall area and volume proportions in the various cross sections of the mark (e.g., % area carrier or substrate to % area microparticles) can be selected to optimize the detection capability of a reader to pick up the unique characteristics of a mark. Based upon the uniqueness of the marks, the overall area and volume proportions (e.g., % volume carrier or substrate to % volume microparticles) in the various cross sections of the mark can also be selected to optimize the ability to serialize articles using the unique codes generated from the mark.

In an embodiment, a mark comprises about 99.999% area carrier or substrate to about 0.001% area microparticles. In another embodiment, a mark comprises about 99.99% area carrier or substrate to about 0.01% area microparticles. In another embodiment, a mark comprises about 99.9% area carrier or substrate to about 0.1% area microparticles. In still another embodiment, a mark comprises about 99% area carrier or substrate to about 1% area microparticles. These levels can enable optimization of the detection capability of a reader to pick up the unique characteristics of a mark and the ability to serialize articles using the expression codes generated from the mark, but also can cut down on microparticle costs. A person of ordinary skill in the art will recognize that additional area ratios within the explicit area ratios given above are contemplated and are within the present disclosure.

In general, the larger-sized particles can require a larger weight and proportion of microparticles for detection and determination capability. Accordingly, the smaller-sized particle can require a smaller weight and proportion of microparticles for detection and determination capability In terms of quantifying the number of microparticles within a mark, a mark can have at least one microparticle and up to any number of microparticles. This number can be determined based upon the requirement for unique microparticle codes and expression codes for specific applications.

In an embodiment, a mark comprises 1-10 microparticles. In another embodiment, a mark comprises 11-40 microparticles. In another example embodiment, a mark comprises 41 or more microparticles, where each multiplicity of microparticles provides a first-level microparticle code and the positions, features, and/or relationships of the individual microparticles is utilized to generate one or more signatures strings as second-level expression codes for the microparticle mark. In one embodiment, the signature strings and microparticle codes can be used to generate a unique expression code for that microparticle mark.

In one embodiment, the adhesive, carrier, or substrate material can be transparent or translucent to the frequency of light used to illuminate the microparticles, such that the microparticles are readily discernable. The adhesive or carrier can include solvent materials, including both organic solvent based adhesives such as lacquers, as well as water based adhesives such as latexes, hot melt adhesives, curing systems including epoxies, polyurethanes, enamels, such as, for example, acrylic and alkyds, or a UV curing material. UV curing materials can enable application of the carrier material with microparticles in high volume applications, due to the quick curing ability.

Automatic Reader

An automatic reader and method according to the various embodiments of the present invention enables a user to place the article to be identified/authenticated in the field of view of the automatic reader. In one embodiment, the reader can manage the remainder of the process and provides the results of the identification and/or authentication based on pre-programmed, predetermined or pre-selected control information as will be described. In an alternate embodiment, the user may input such control information or may make adjustments to facilitate the capture of the microparticle mark, such as adjusting focus, illumination, depth of field or the like.

Referring to FIG. 7, such a reader generally comprises software, a microprocessor, data storage, a user interface, and a digital signal processor. The automatic reader of this invention also generally includes an illuminator for illuminating the article to be identified/authenticated, optics for magnification of the applied mark, and a sensor for capturing an electronic image.

The illumination can be obtained from a variety of illumination sources, including but not limited to incandescent lights, fluorescent lights, halogen lights, xenon lights, light-emitting diodes (LED) lamps, lasers, and other illumination sources known to those skilled in the art. LED lamps are particularly advantageous, as they can provide the ability to deliver a controlled spectrum, i.e., the colors are selectable, well defined, allow tight control of wavelengths, and do not shift. The lighting can be direct or fiber optics, mirrors, etc., which can be used to deliver the illumination from a remote source to the mark on the article. Preferably, the illumination is provided in a visible part of the electromagnetic frequency range. Alternatively, other portions of the electromagnetic frequency range could be utilized in accordance with the illumination of the automatic reader of the present invention.

In one embodiment, the illumination system comprises a plurality of light sources, each of the light sources being independently and variably controllable by the processing system to dynamically illuminate the microparticle mark. In one aspect of this embodiment, the dynamic illumination consists of high-intensity LEDs, such as white, red, blue, and green individual LEDs in combination.

The optics and optics path can be constructed with lenses of various shapes, configurations, and coatings to provide the necessary magnification, field of view, and depth of field. Additionally, filtering can be used to focus/highlight colors of interest (valid color layers) or to provide a customer or application specific reader. Fixed focus with control of distance between an article and the reader, or autofocusing capabilities, can be employed in the automatic reader. Although manual focusing may be used, it may not be suitable for all users because it can introduce an additional human step and therefore variability. The optics path can also be designed for particular surfaces (e.g., multilevel or curved surfaces).

The sensor used to capture the light from the optics path can be selected from many readily available types, including, but not limited to, complementary metal oxide semiconductor (CMOS) and charged coupled device (CCD) sensors. The specific sensor chosen generally is dependant upon the application (e.g. particle size being used and magnification) and is generally chosen to provide the sensitivity and resolution necessary to complete the analysis.

The above-mentioned components can be assembled to work together to capture the information from the applied mark and generate an electronic image of the mark within an integrated, single housing, such as a handheld reader. Alternatively, these components may be bundled or combined (e.g., currently available universal serial bus (USB) microscope providing illumination, optics, and electronic sensors) as separate elements of part of a reader system, such as for use in a production assembly line operation for initial capture of microparticle marks.

In an embodiment, the automated reader housing includes means for optically isolating the illumination system, the detection system, and the microparticle mark from an external environment. The automated reader may include a hood, such as, for example, a foam member generally surrounding a field of view of the detection system and adapted to interface proximate to a perimeter of the microparticle mark. Examples of such hoods are shown in FIGS. 11A-E.

Microparticle Code Identification and Authentication

Figure 8:
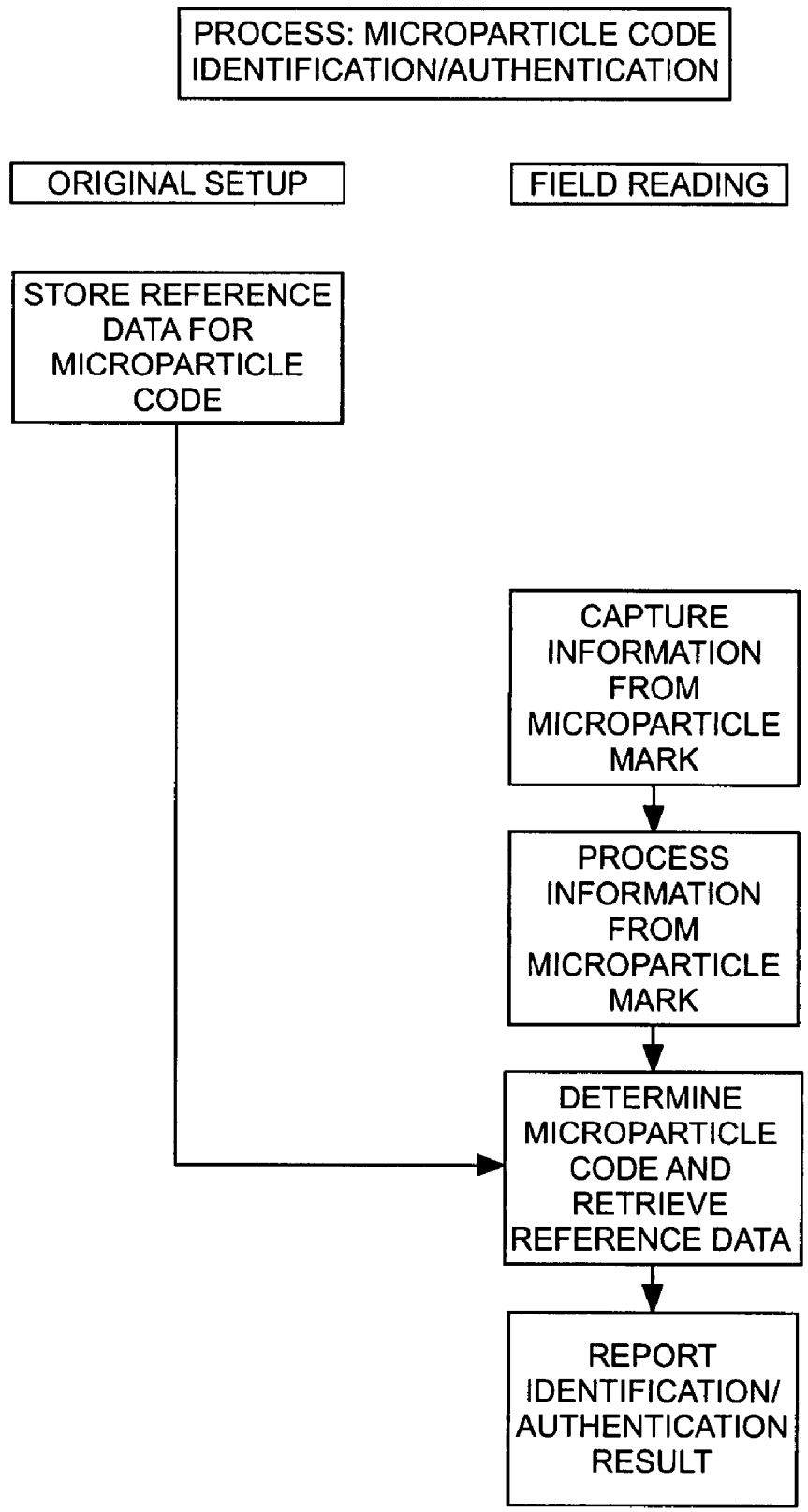
FIG. 8 is a block diagram of a microparticle code identification/authentication method according to an embodiment of the present invention.

Referring to FIG. 8, a block diagram of the process for an embodiment depicting multi-layer, multi-colored microparticle code identification/authentication is depicted. The steps for microparticle code identification/authentication broadly include (1) original setup and (2) field reading. Original setup broadly includes storing data or algorithms for determining each microparticle code and optionally additional reference data associated with a microparticle code. Field reading broadly includes (a) capturing information for a microparticle mark on an article in the field, (b) processing microparticle information from the microparticle mark, (c) determining the microparticle code and retrieving reference data, and (d) reporting the identification/authentication results, along with associated reference data.

One or more kinds of microparticles can be selected for a set of microparticle marks. Once a set of one or more kinds of microparticles have been selected for a given set of microparticle marks, microparticle marks incorporating the one or more kinds of microparticles can be applied to a corresponding set of articles. While the microparticle codes associated with a given set of microparticles corresponding to an intended set of articles will generally be selected to be unique for a given manufacturer, article, or distribution channel, in other embodiments the set of microparticles chosen for an intended set of articles may overlap. The microparticle mark can be applied manually or automatically. Manual application methods include extruding, molding, brushing, and spraying. Automatic application methods can include the above-mentioned techniques, as well as, for example, roll coating and printing. The microparticle and carrier materials are described in detail above.

A field reading process can be used to determine the identity and/or authenticity of an article and the mark on the article in accordance with some embodiments of the present invention. First, the sensor in the automatic reader apparatus is used to capture the light from the optics path and generates an electronic image of the mark. Once an electronic image of the mark has been generated, an image processing program can analyze the electronic image.

Figure 9:
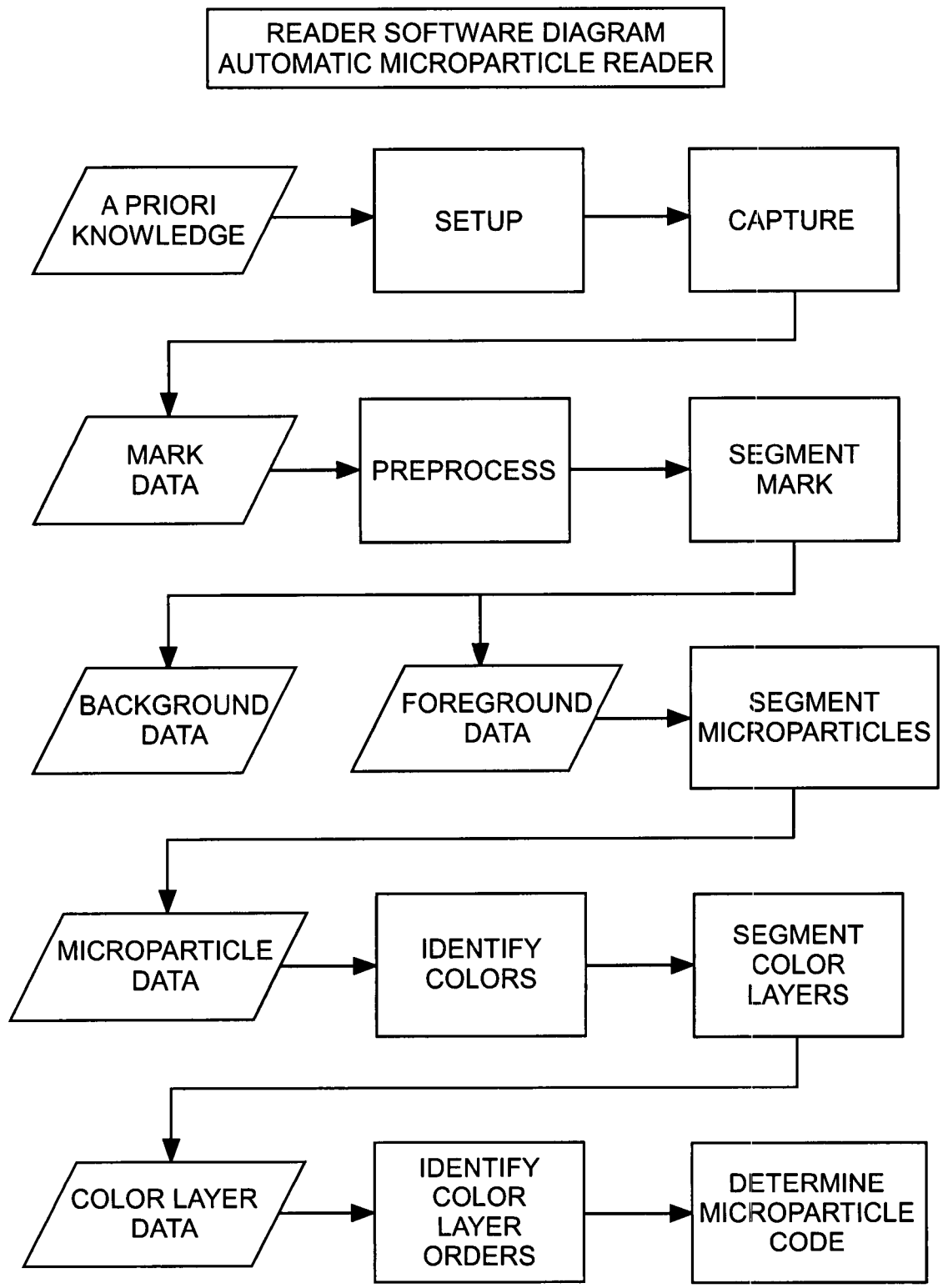
FIG. 9 is a software diagram for an automatic microparticle reader according to an embodiment of the present invention.
Figure 10A:
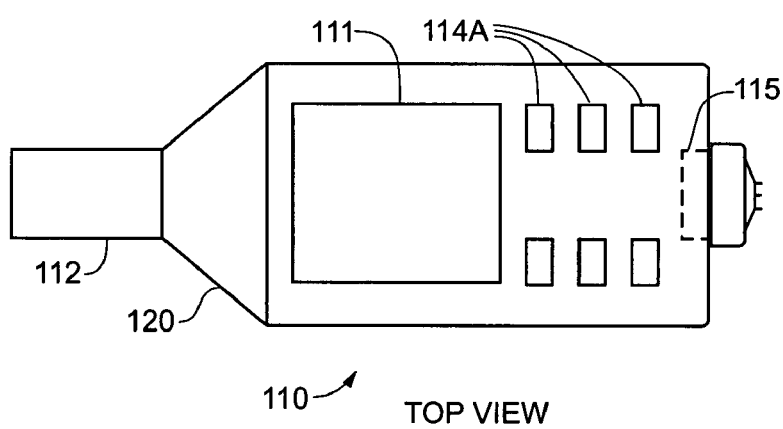
FIGS. 10A-D are top, rear, side, and front views, respectively, of an automatic microparticle reader according to an embodiment of the present invention.
Figure 10B:
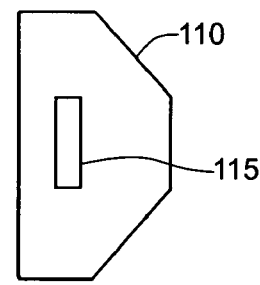
Figure 10C:
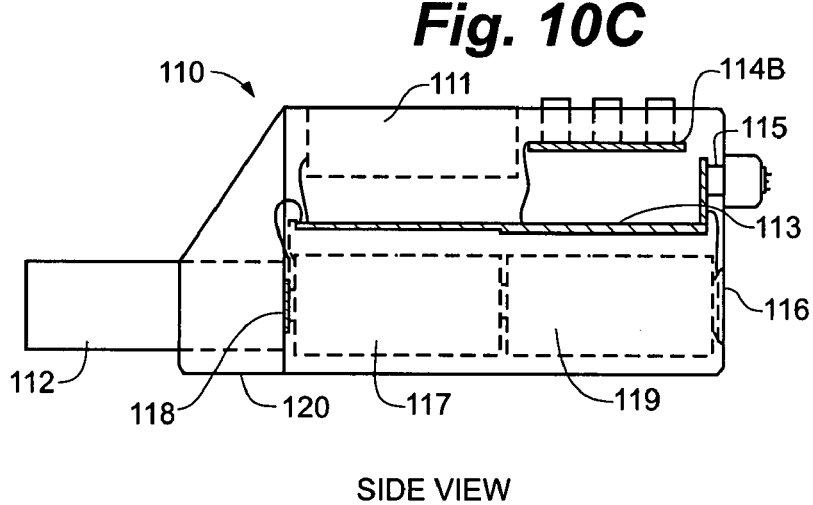
Figure 10D:
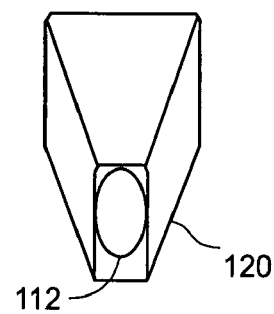

An embodiment of an image-processing program, such as that generally described above, is shown in FIG. 9 and will be described, although variations and differences in other embodiments as described elsewhere may be applicable to this description of FIG. 9. A priori knowledge of the marks includes the particle size, number of layers, standard color definitions, and other distinctive aspects of the marks. The setup step includes the application of a priori knowledge to a specific application, and may also include the algorithms to be used. Calibration of the capture system is also part of the setup step, including settings such as depth of field, white balance, gamma, and so on. The capture step includes the taking of a dataset from the sample and may further include taking more than one frame for averaging to reduce the effects of noise.

The mark data refers to the total dataset readable from a mark as an image. A mark may be viewed as a region on an article that contains introduced microparticles in a carrier medium, where the carrier could be an additional medium or a portion of the article itself. In some embodiments, the microparticles are fixed relative to the article in the microparticle mark, while in other embodiments the microparticle mark may be flexible. In some embodiments, the microparticles are randomly introduced into the microparticle mark, where in other embodiments the microparticles are pseudorandomly introduced or purposefully located in the microparticle mark.

At the preprocess step, the raw captured data is prepared for further processing. This may include adjustments in calibration, noise reduction (such as by averaging of multiple image frames) and data transformations (such as by transforms to other color spaces or other dimensional spaces). For example, a red-green-blue (RGB) image may be mapped to other color spaces, such as Lab, Luv, HSL, HSV, etc. Information such as position, height, or color space can be added to pattern-vector information to obtain a higher dimensional space which can enhance segmentation or identification.

The step of mark segmentation includes segmentation of microparticles from background data. This step reduces the amount of the computations involved in reading the mark and enhances the automatic read. Many different algorithms may be used for this step, and the specific algorithm can vary depending on the application. For computational efficiency, a priori knowledge of the information readable in microparticle marks may be used. For example, in an embodiment, the microparticles in a microparticle mark are present at low levels relative to the total dataset (because most of the data is background). Here, frequency-based segmentation algorithms are useful and captured data may be passed through various statistical functions, to segment the data into foreground or background data sets. Segmentation may also be done manually (by picking the background color and removing all similar colors). Further examples include simple pixel thresholding, edge detection, transform filters (Fast Fourier Transform and inverse FFT). Watershed and neural networks may also be used.

In the next step, microparticle segmentation, the foreground data bin is separated into distinct regions, with each region being a possible microparticle. The foreground dataset can be converted to microparticle regions of interest by identifying collections or regions of neighboring data of proper size for the microparticles of interest.

The step of color identification can involve the determination of which identified microparticles have colors that match definitions of standard microparticle colors. At this step, a transform to a desired color space may be used, if such a transform was not done already. Thresholding may also be used to remap the microparticle data to standard colors.

In the step of color-layer segmentation, each microparticle is separated into distinct regions corresponding to the color layers. In an embodiment, a segmentation algorithm based on location and color thresholds can be used.

The step of identifying color layer order includes the ordering of color layers identified within each microparticle region. This may be done by calculating centers of each layer region, calculating the distances between centers, and using distances to determine order. Errors that may result from this step include finding two small particles in a single identified microparticle region or splitting a single layer into a plurality of layers. Such errors may be reduced by examining vectors connecting the noted centers and requiring a linear relationship between them.

The step of determining microparticle code can be accomplished using an algorithm to generate the code or the microparticle code can be automatically looked up in a table or database to determine the code for the microparticles identified. Additionally, reference information associated with the code may also be retrieved.

In actual practice, the processing of the electronic image of the mark can present problems that generally must be overcome for effective reading of a microparticle code. While humans can look at an object or image and observe certain areas as a single color, electronic image data of these areas are generally made up of pixels of many different colors and not of a single color. This can arise for any number of reasons, including actual color variations in the object being imaged, variations in the lighting source(s), shadow variations, light scattering, substrate influences, and carrier influences.

In addition, even though a microparticle set can be generated with microparticles formed from colored layers incorporating uniform, standard colors, the electronic image will generally present a multitude of various colored pixels for each of the uniform, standard colors incorporated in the microparticles (i.e., the pixels observed for each colored layer are not all observed to have the same RGB values).

To obtain improved recognition of the microparticle layer colors, ranges are established for the R, G, and B values, such that an exact match is not required. Thus, a level of variability for each of the R, G, and B values for any given microparticle layer color can be assigned and any pixels falling within the specified resulting ranges can then be associated with that microparticle layer color. While this enables a much improved ability to identify each of the microparticle layers and their colors, many additional pixels can be present in the image that were part of the microparticle layers but whose color was not associated with one of the standard microparticle layer colors.

Some of the difficulties associated with the analysis can result from variations in lighting (brightness) and shadowing (darkness). These lighting (brightness) and shadowing (darkness) effects can be overcome by identifying a color through looking at ratios of the R, G, and B levels, not looking at the absolute values for each of the R, G, and B levels. Thus, a pixel with R=255, G=0 and B=0 is recognized to be pure, bright red. Another pixel with R=125, G=0 and B=0 is still recognized as pure red, but is darker. By analyzing the image to identify pixels with ratios of their R, G, and B values that match those of one of the standard microparticle layer colors, the microparticle layer color can be effectively identified, despite variations in brightness and shadowing.

In addition, despite improvements in effectively identifying the standard microparticle layer colors, difficulties can be encountered due to light scattering or reflecting from the substrate or layers. When such scattering or reflecting occurs, the microparticle layer colors can be shifted from their standard colors. As a result, some of the illumination reaching the microparticle is no longer of the same spectrum as the light source, but now has been "colored" by reflection or scattering off of the substrate or layers.

Thus, for each of the colors of the substrate and layers, light of some wavelengths can be selectively absorbed by the substrate while other wavelengths are not. The resulting light scattered and reflected, with its different spectrum, can then light the microparticles and contribute to a color shift of the microparticles or can reach the sensor and change the color signature for pixels associated with a microparticle. These color-shifting effects can be corrected for by adjusting the expected color values for each of the standard microparticle layer colors for predicted values that can be expected due to the shift. Similarly, the expected color values for each of the standard microparticle layer colors can also be corrected for the spectrum of the light source used to illuminate the mark. While the corrections made for determining a match—due to the spectrum of the light source—can be made for all pixels in the image, the corrections needed due to background scattering may generally need only take into account the color of the background in the surrounding area of the microparticle (i.e., the color of the substrate in the areas scattering light onto the microparticle).

In one embodiment of an anti-counterfeiting setting, if there are no valid three-dimensional microparticles identified or a valid microparticle code or match with reference data, depending upon what embodiments of the invention-have been utilized, then the mark might be or is likely a counterfeit and the process can be stopped and it can be reported that the mark and/or product is not authenticated. If there is a match for the mark, the matching microparticle code can be reported. If it is desired to go a next level of security, the following steps relating to microparticle mark signature authentication can be used to authenticate the microparticle mark's expression code based upon the signature characteristics of the microparticle mark. This step can represent a next-level of protection against counterfeiting.

In one embodiment of an anti-product diversion setting, if there is a match for the mark, the matching code can be reported and the source and/or distribution chain of the product and mark can be identified. If it is desired to go a next level of security, the following steps can be used to identify the microparticle mark's expression code based upon the signature characteristics of the microparticle mark. This step can represent a next-level of protection against product diversion.

Expression Code Identification and Authentication

In addition to providing a next level of securing against counterfeiting, tampering, and product diversion, a microparticle mark expression code based upon signature strings can be used to provide identification and/or authentication through comparison of a calculated alphanumeric string to a database of existing original alphanumeric strings rather than through manual comparisons of raw images directly as described in U.S. Pat. No. 6,309,690. This process can therefore greatly minimize the amount of storage needed to save information about products and marks and also speed up the process by comparing alphanumeric strings rather than digital or analog images.

Figure 15:
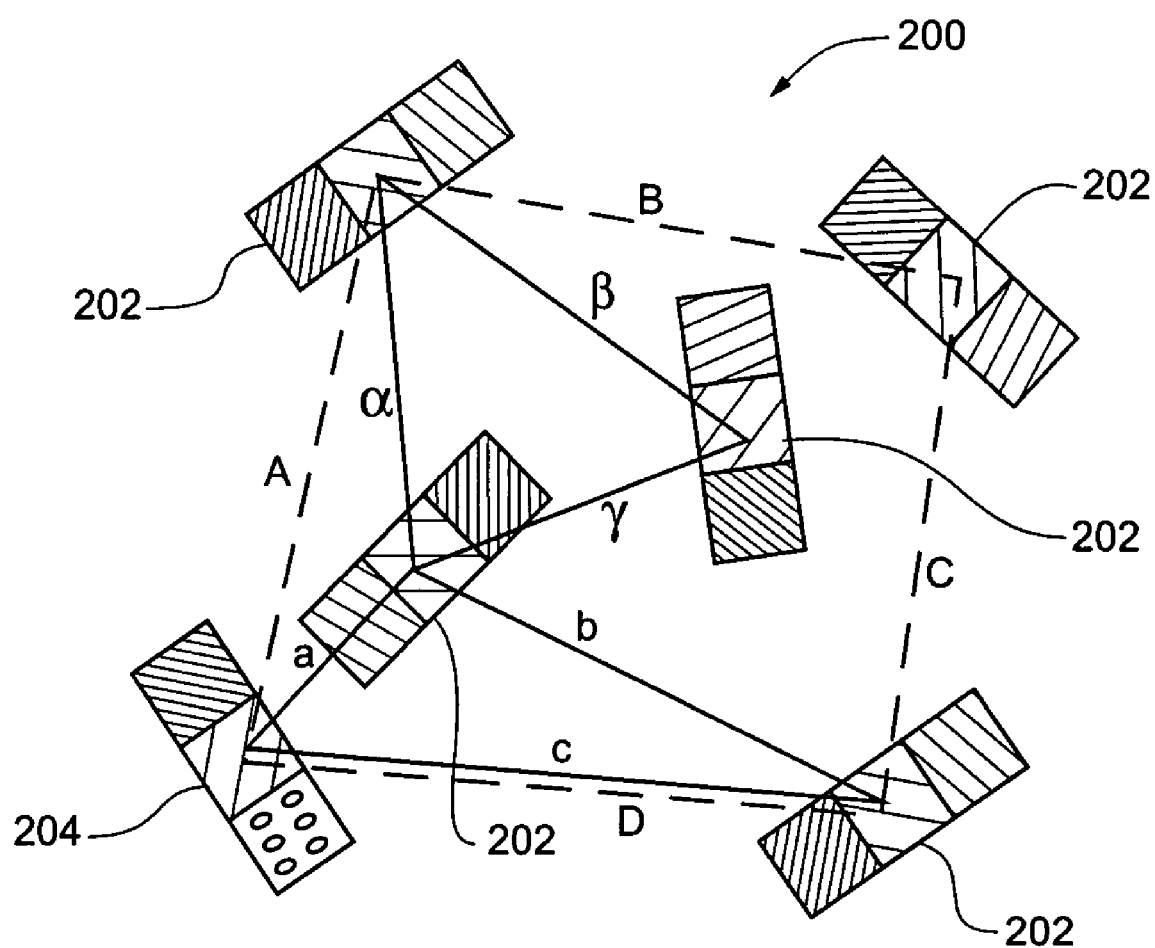
FIG. 15 is an illustrative example of patterns that could be used to derive signature strings from a multiplicity of microparticles.

FIG. 15 shows how the relationships between individual microparticles 202 can be used to derive signature strings. Using the centroid of each microparticle 202, 204 as a reference, the generally rectangular shape defined by lines A, B, C, and D can be formed. Using the centroids joined by lines alpha, beta, and gamma forms a triangle shape between three microparticles 202. Another triangle shape can be formed from the centroids of microparticles 202, 204 using lines a, b, and c. These patterns are illustrative only, since the relative position of microparticles 202, 204 can be used to generate a very large number of possible patterns that can be used as signature strings. Microparticle 204 is shown to illustrate that not all microparticles used need have the same or even similar attributes.

Reader Device

In embodiment, a microparticle reader 110 may be configured as shown in FIGS. 10A-D, 11A-E, and 12. FIGS. 10A-D depict a display 111, lens assembly 112, and a main circuit board 113 connected to display 111. Six buttons 114A are connected to button-circuit board 114B. A USB plug 115 is mounted on the main circuit board. A rear spring battery contact 116 is connected to main circuit board 113, as is front battery 117 and lens assembly plug connector 118 and rear battery 119. The unit's housing 120 is designed to make the reader portable by hand.

Figure 11A:
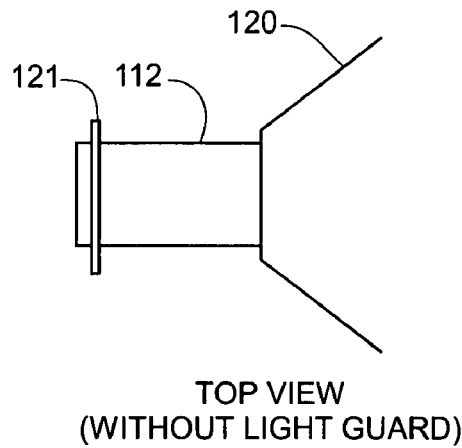
FIGS. 11A-E are a top view (without light guard), top view (with light guard), side view, and two front views, respectively, of an automatic microparticle reader according to an embodiment of the present invention.
Figure 11B:
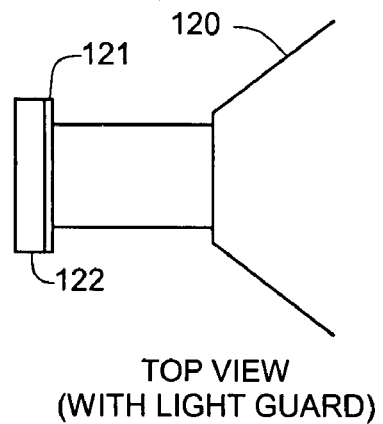
Figure 11C:
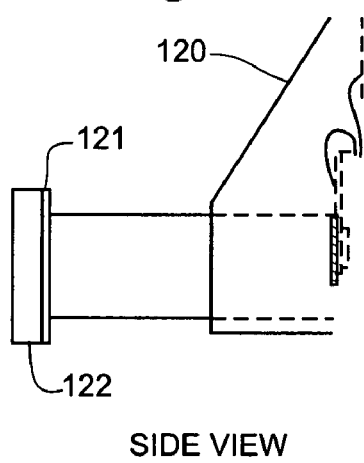
Figure 11D:
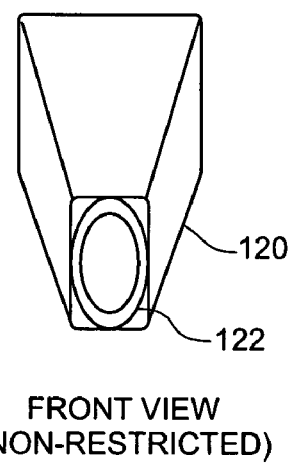
Figure 11E:
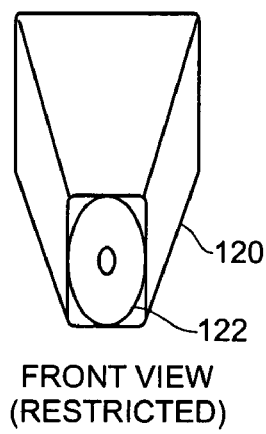

As shown in FIGS. 11A-E, in one embodiment an annular projection 121 may be fitted to lens assembly 112 for receiving a hood 122. As shown in FIGS. 11D and 11E, Hood 122 may be adjustable so that both a restricted and non-restricted aperture is presented. Adjustments in hood 122 may be made depending on the amount of ambient light available when the microparticle reader is put into operation.

Figure 12:
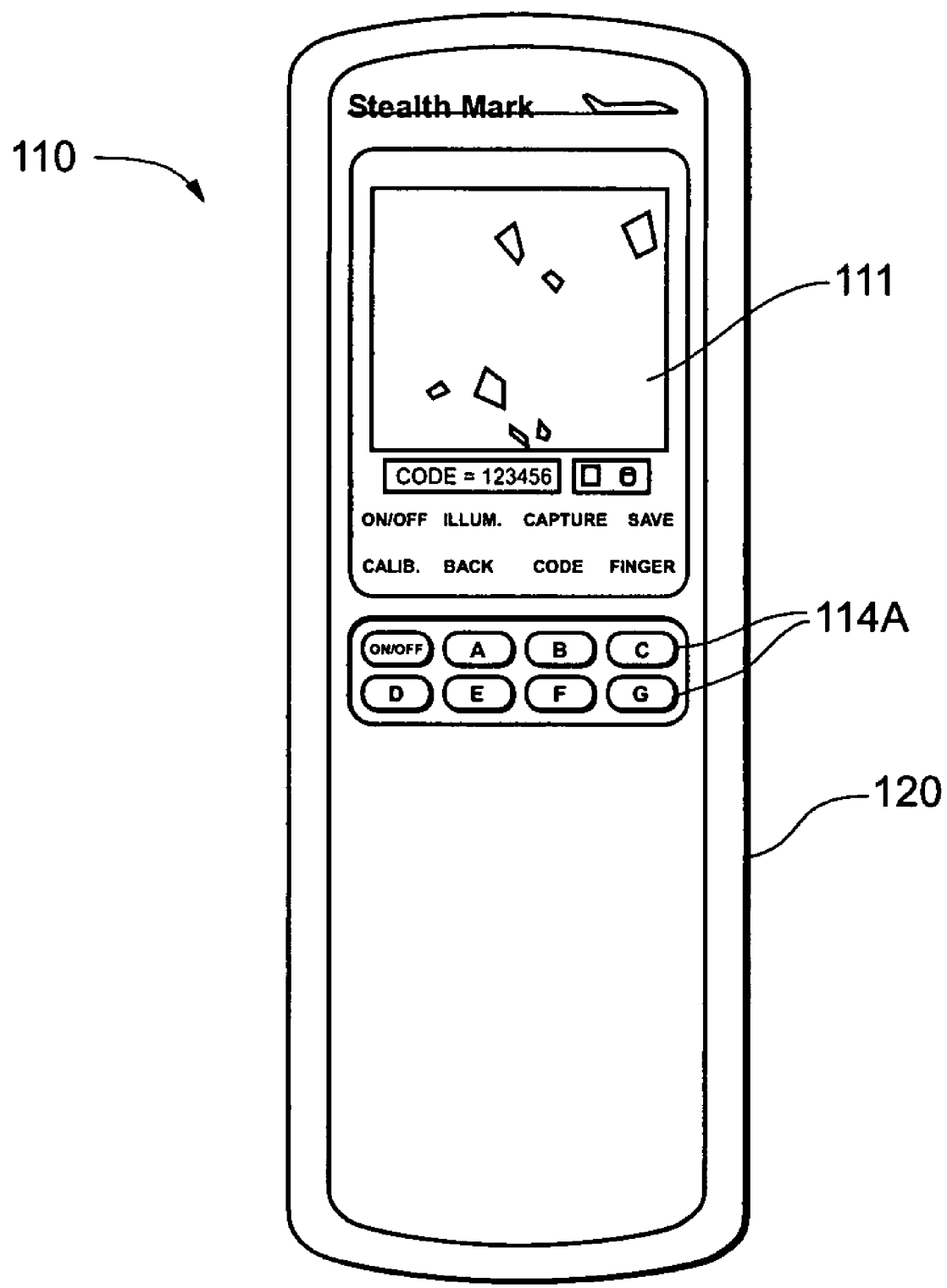
FIG. 12 depicts an automatic microparticle reader according to an embodiment of the present invention.

As shown in FIG. 12, in one embodiment the display 111 can display an enhanced image of a microparticle mark, such as the mark shown in FIG. 2. A user interface is provided by buttons 114A. Housing 120 is sized so that device 110 is relatively easy to carry by hand.

Relationship Between Microparticle Code, Signature Strings, and Expression Code

Figure 13:
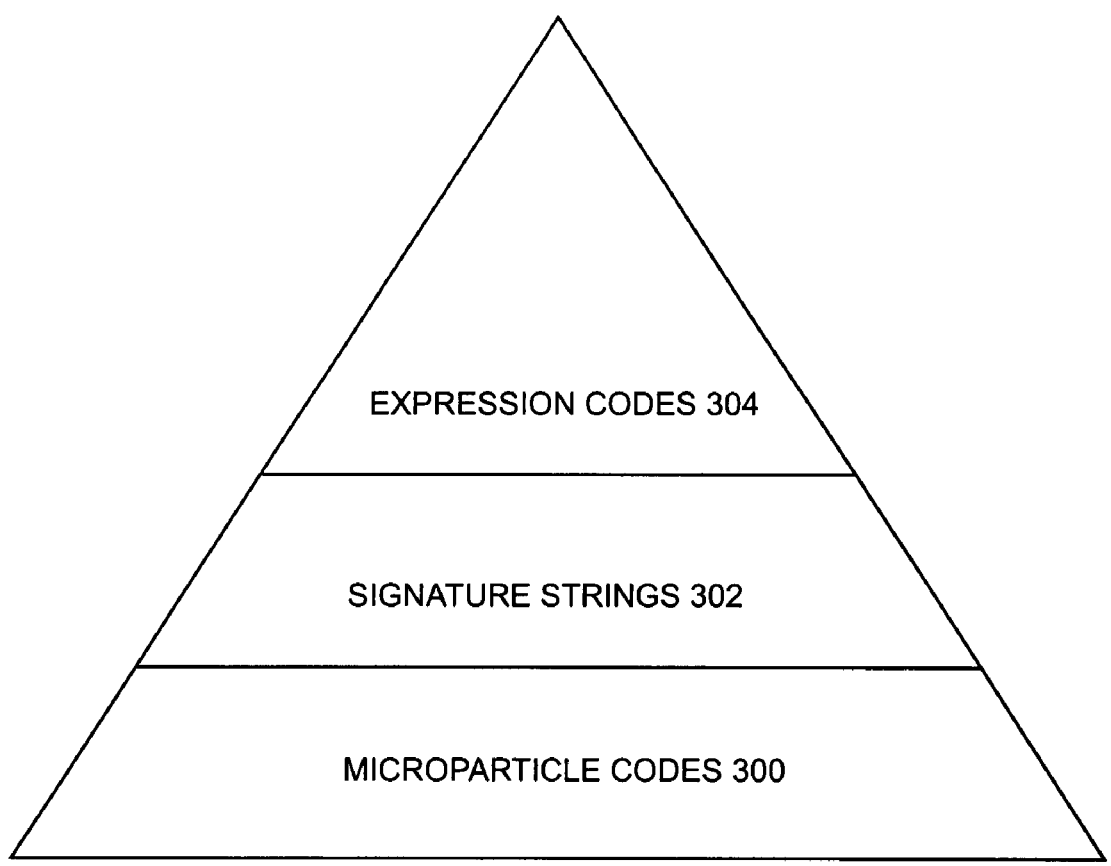
FIGS. 13 and 14 are diagrams showing relationships between expression codes, signature strings, and microparticle codes.
Figure 14:
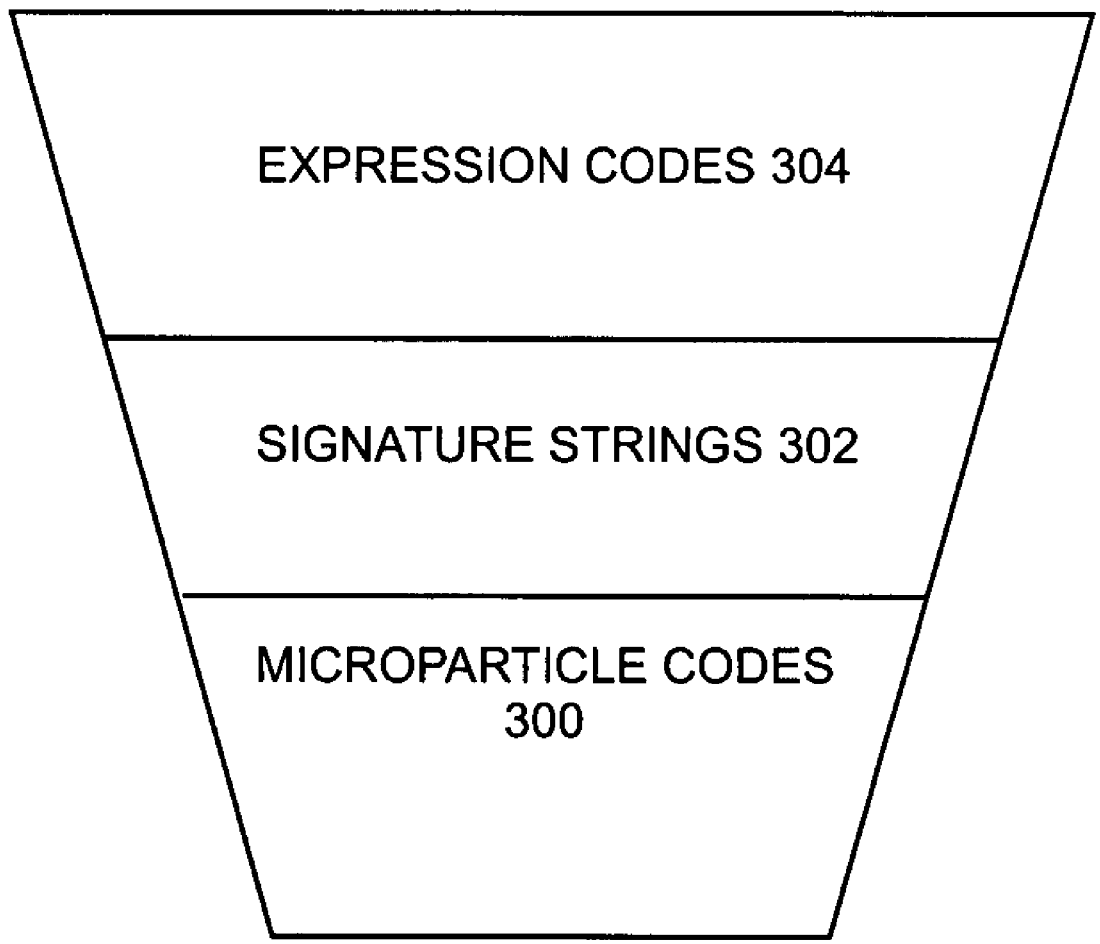

The hierarchical relationship between microparticle codes 300, signature strings 302, and expression codes 304 can be as illustrated in FIG. 13. The numeric abundance of unique combinations of microparticle codes, signature strings, and expression codes is illustrated in FIG. 14. If the number of microparticle codes 300 is, for example, on the order of n, then the number of signature strings 302 would be exponentially larger $n^x$, while the number of expression codes would be further exponentially larger $n\hat{}x^2$.

Overall System Examples

Figure 16:
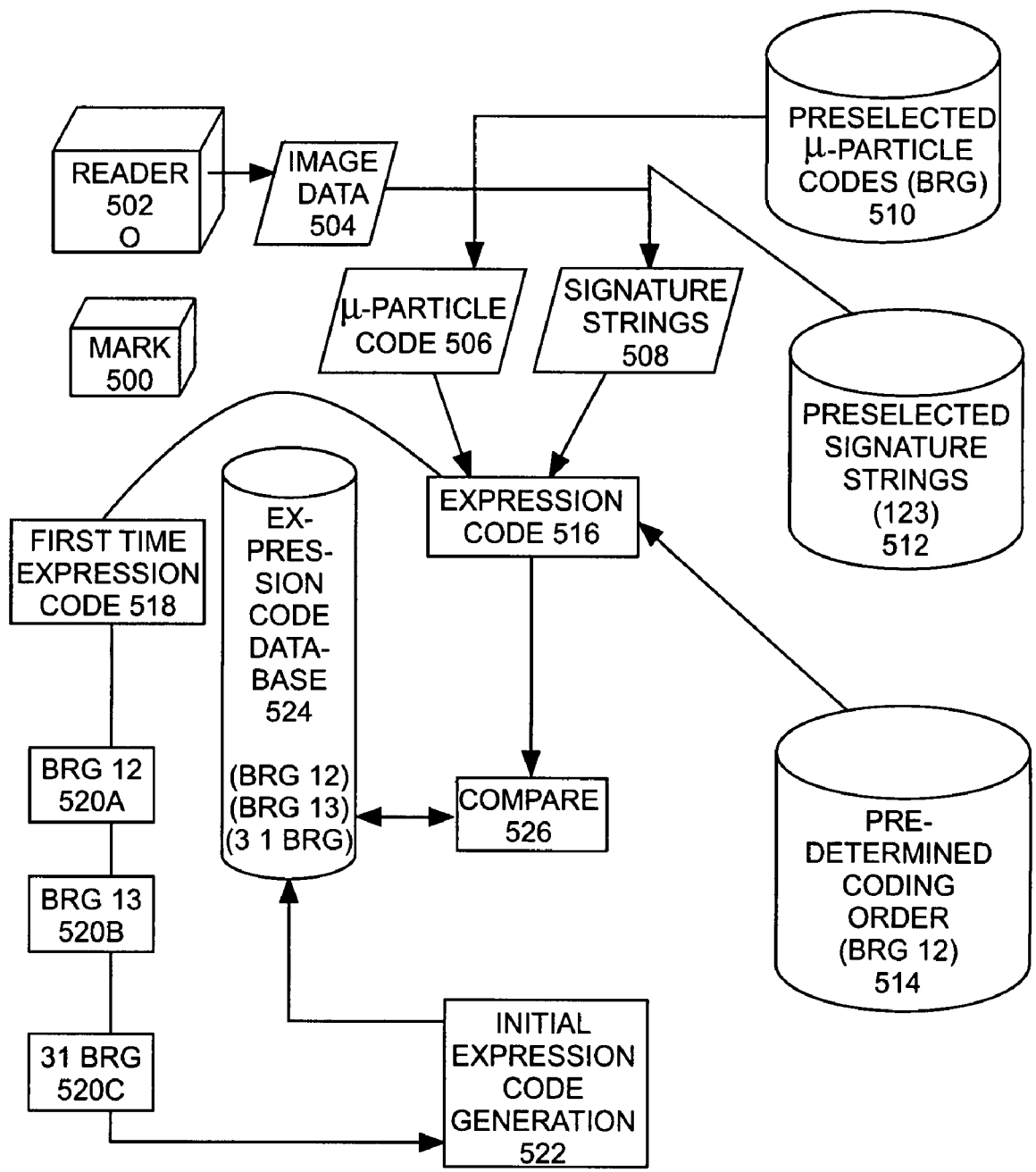
FIGS. 16, 17, and 18 are process diagrams that show how embodiments of the invention can be used to generate and use expression codes and signature strings.

FIG. 16 is a block diagram of a process for authenticating a mark 500. Reader 502 captures an image 504 of mark 500. Image 504 includes microparticle code 506 and signature strings 508. Database 510 stores preselected microparticle codes, for example BRG for the color sequence Blue, Red, and Green that represents a valid microparticle code. Database 512 stores preselected signature strings, for example the signature strings 1, 2, and 3. Database 514 stores a predetermined coding order, for example, first the code for colors BRG, then the signature strings 1 and 2. When microparticle code 506 and signature strings 508 are sorted and/or combined as determined by databases 510, 512, and 514, an expression code results. For example, the expression code could be any of BRG 12, BRG 13, or 31 BRG, in this example.

An initial generation of expression codes may be used to generate a database of expression codes 518 to compare with expression code 516. First-time expression codes 518 may be identified, for example, with codes 520A, B, and C. In this example, these codes may be BRG 12, BRG 13, and 31 BRG, respectively, depending on the possible alternative combinations of predetermined coding order 514 and/or preselected signature strings 512. Codes 520A, B, and C are part of initial expression code generation 522. These codes are then used to populate expression code database 524.

Figure 17:
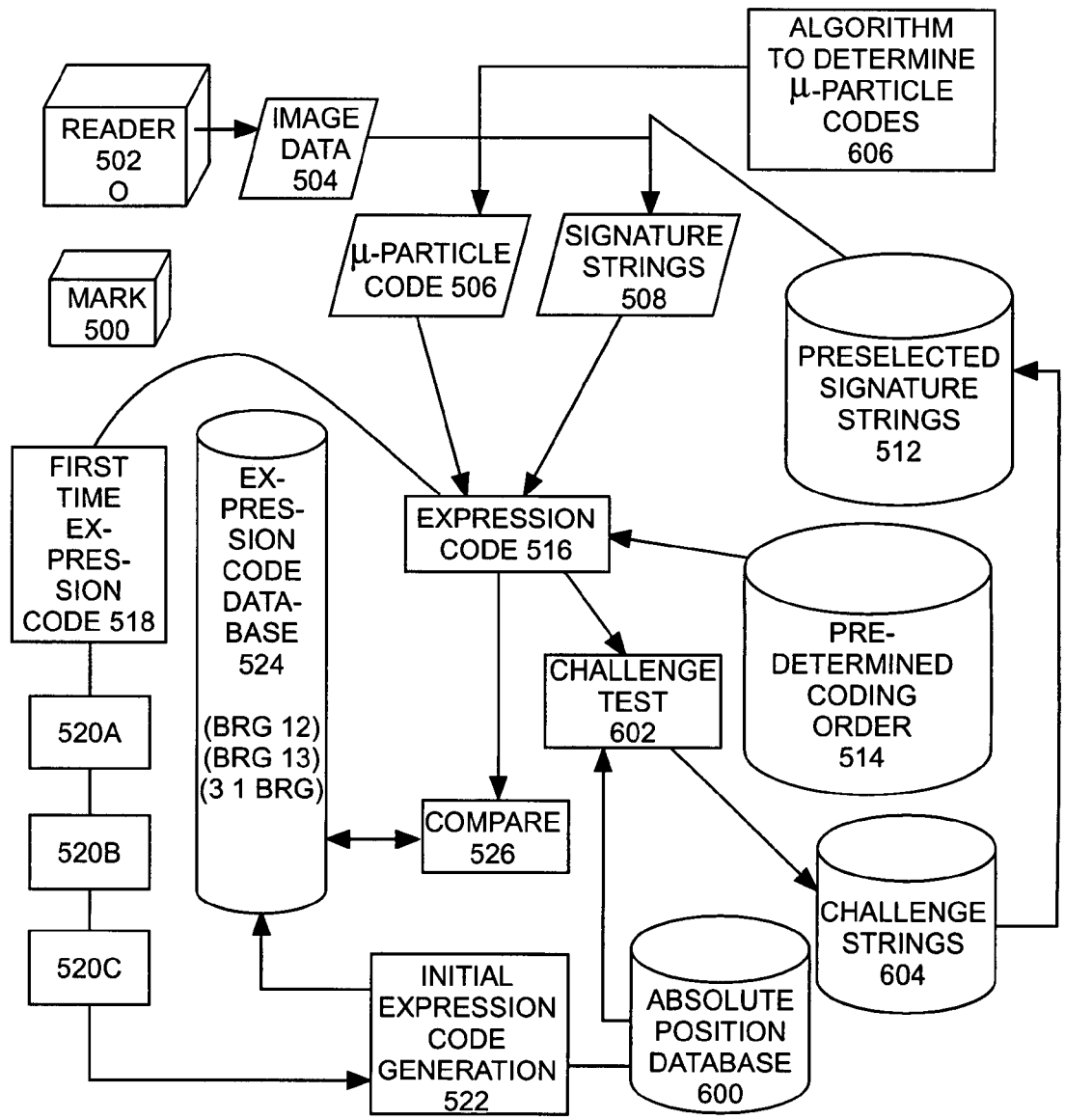

FIG. 17 shows an embodiment of the process in FIG. 16 with a "challenge" process added to test the reliability of the system. An absolute-position database 600 is generated from mark 500. From the absolute-position data, challenge test 602 generates a database of challenge strings 604. Challenge strings 604 are communicated to the preselected signature-database 512 and used to generate signature strings 508 from image data 504. The resulting expression code 516 is then compared to challenge test 602. Because challenge strings 604 are generated from absolute-position data from mark 500, each of expression codes 516 produced by signature strings 508 based on image data 504 should be recognized as authentic by challenge test 602. Further, this embodiment depicts the determination of the microparticle code using an algorithm 606 rather than a database.

Figure 18:
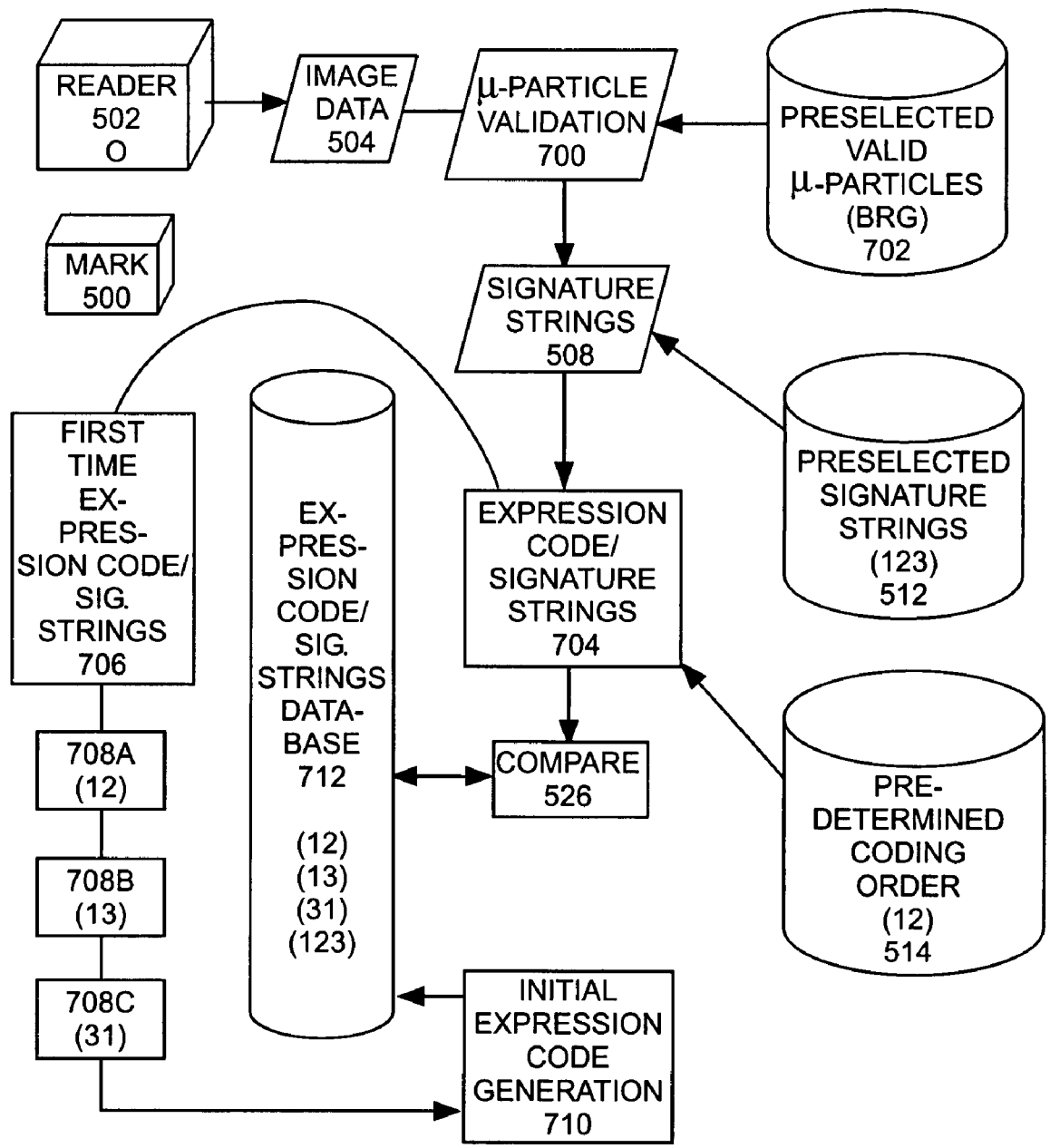

FIG. 18 shows an embodiment of an authentication process that relies only on signature strings to generate expression codes. Image data 504 from mark 500 is captured by reader 502. Microparticles in image data 504 are authenticated as expected microparticles by microparticle validation 700, in part by reference to database 702 of preselected valid microparticles. From the valid microparticles, signature strings 508 are identified. These signature strings 508 then produce an expression code or signature-string code 704, which may include only signature strings, or may include other code elements. The first time the process shown in FIG. 21 is implemented, a first-time expression code or signature-string code 706 may be generated. Exemplary signature-string codes are shown at 708A, B, and C, for example 12, 13, and 31. These expression codes or signature-string codes 706 are used to generate initial expression codes or signature-string codes 710, which then are used to populate database 712, which stores expression codes or signature-string codes. Exemplary signature-string codes may include, for example, 12, 13, 31, or 123.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

For purposes of interpreting the claims for the present invention, it is expressly intended that the provisions of Section 112, sixth paragraph of 35 U.S.C. are not to be invoked unless the specific terms "means for" or "step for" are recited in a claim.

The invention claimed is:

1. An automated reader for reading a microparticle mark that includes a multiplicity of multi-layer, multi-color microparticles, the automated reader comprising:
   a handheld structure housing a processing system, an illumination system and a detection system powered by a power source, the illumination system and the detection system being adapted to capture at least one image of the microparticle mark,
   wherein the processing system analyzes the at least one image and includes:
      means for identifying at least one region of interest in the at least one image corresponding to at least one of the multi-layer, multi-color microparticles;
      means for recognizing colors and layers for each region of interest;
      means for recognizing a layer order of the colors and layers for each region of interest;
      means for generating a code representative of the microparticle mark that is based on the colors and layers and the layer order of at least one of the at least one region of interest.

2. The automated reader of claim 1 wherein the means for identifying at least one region of interest comprises:
   means for segmenting the at least one image into foreground areas and background areas;
   means for grouping foreground areas into a region of interest based on proximity of the foreground areas by applying one or more additional filtering processes selected from the set including: color, edge detection, texture, fluorescence, luminescence, reflectance, transition filters, statistical based filters, fast Fourier transforms, watershed filters, neural filters, Bayesian filters or any combination thereof;
   means for confirming each region of interest by applying one or more additional filtering processes selected from the set including: size, texture, fluorescence, luminescence, reflectance, or any combination thereof.

3. The automated reader of claim 1 wherein the means for recognizing colors and layers comprises:
   means for performing a color transform on at least a portion of the at least one image to generate a transformed color space dataset where luminescence is separated from color information;
   means for applying a threshold function to the transformed color space dataset to identify colors matching expected colors of the multi-layer, multi-color microparticles; and
   means for recognizing different layers in each region of interest by identifying regions of common color in the transformed color space dataset.

4. The automated reader of claim 1 wherein the means for recognizing colors and layers comprises:
   means for recognizing different layers in each region of interest by using edge detection;
   means for performing a color transform on at least a portion of each layer to generate a transformed color space image where luminescence is separated out; and
   means for applying a threshold function to the transformed color space image to identify a color of the at least a portion of each layer matching expected colors of the multi-layer, multi-color microparticles.

5. The automated reader of claim 1 wherein the means for recognizing the layer order comprises:
   means for determining adjacent layers by virtue of a proximity of less than a predefined gap; and
   identifying an order of the adjacent layers as the layer order.

6. The automated reader of claim 5 wherein the means for recognizing the layer order further comprises:
   means for resolving the layer order by requiring a center point of adjacent layers to have a linear bend of less than about 20 degrees.

7. The automated reader of claim 1 wherein the processing system further includes:
   means for storing a predetermined set of codes representative of the valid multi-layer, multi-color microparticles expected for the microparticle mark; and
   means for comparing the code to the predetermined set of codes to authenticate the microparticle mark.

8. The automated reader of claim 1 wherein the processing system further includes:
   means for applying an algorithm to the code to determine if the code is a valid multi-layer, multi-color microparticles expected for the microparticle mark.

9. The automated reader of claim 1 wherein the processing system further includes:
   means for generating at least one signature string representative of at least one feature relationship among only regions of interest in the microparticle mark that represent valid microparticles, the at least one signature string being generated based on at least one predetermined feature relationship stored in the automated reader that represents a valid signature string.

10. The automated reader of claim 9 wherein the processing system further includes:
means for generating at least one expression code for the microparticle mark based on the at least one signature string, the expression code being adapted to be compared to a predetermined database of valid expression codes to determine if there is a match.

11. The automated reader of claim 10 wherein the processing system further includes:
means for storing the predetermined database of valid expression codes that is operably housed within the handheld structure.

12. The automated reader of claims 7-11 further comprising a user interface operably connected to the processing system that displays an indication of an authentication of the microparticle mark based on a valid code selected from the set including: a valid microparticle code, a valid signature string, a valid expression code, or any combination thereof.

13. The automated reader of claim 10 wherein the predetermined database is remote from the automated reader and the automated reader further comprises means for communicating the expression code over a computer network to a processing system associated with the predetermined database such that the processing system determines if the match exists between the expression code and the predetermined database.

14. The automated reader of claim 10 wherein the match is based on a confidence level that matches less than all of the expression code.

15. The automated reader of claim 10 wherein the means for generating at least one expression code generates the at least one expression code based on at least two different signature strings.

16. The automated reader of claim 15 wherein the match is performed at a reduced confidence level based on a match of less than all of the at least two different signature strings.

17. The automated reader of claim 15 wherein the means for generating at least one expression code generates the at least one expression code based on a predetermined order of the at least two different signature strings.

18. The automated reader of claim 15 wherein the means for generating at least one expression code generates at least two different expression codes based on at least two different combinations of signature strings, each expression code being a valid expression code for the same microparticle mark.

19. The automated reader of claim 9 wherein the means for generating the at least one signature string generates a plurality of features as part of a single signature string.

20. The automated reader of claim 10 wherein the means for generating the at least one expression code generates encrypts the at least one expression code.

21. The automated reader of claim 9 wherein the means for generating signature strings generates the at least one signature string using a process selected from the set including: a size of the microparticle, a length of microparticle perimeter, an aspect ration of the microparticle, a major axis of the microparticle, a minor axis of the microparticle, an average color of the microparticle, a shape of the microparticle, a texture of the microparticle (e.g., smooth, rough, gloss), a pattern of the microparticle (e.g., striped, circular, layered, solid, spotted, woven), an indicia on the microparticle (e.g., text and graphics), and an orientation of the microparticle, or any combination thereof.

22. The automated reader of claim 1 wherein the means for generating the code utilizes multiple colors in a single kind of microparticle.

23. The automated reader of claim 1 wherein the means for generating the code utilizes multiple colors from a plurality of kinds of microparticles, each having different arrangements of multiple colors.

24. The automated reader of claim 1 wherein the illumination system comprises a plurality of light sources, each of the light sources being independently and variably controllable by the processing system to dynamically illuminate the microparticle mark.

* * * * *

UNITED STATES PATENT AND TRADEMARK OFFICE
CERTIFICATE OF CORRECTION

PATENT NO. : 7,720,254 B2  Page 1 of 1
APPLICATION NO. : 11/685764
DATED : May 18, 2010
INVENTOR(S) : Stierman et al.

It is certified that error appears in the above-identified patent and that said Letters Patent is hereby corrected as shown below:

Title Pg, Item (75) Inventors: Christopher S. Gourley and Steven D. Zimmermann should be removed.

Signed and Sealed this

Sixth Day of July, 2010

David J. Kappos
*Director of the United States Patent and Trademark Office*